United States Patent
Ikefuji et al.

(10) Patent No.: US 11,835,619 B2
(45) Date of Patent: Dec. 5, 2023

(54) SYNTHETIC APERTURE RADAR SIGNAL ANALYSIS DEVICE, SYNTHETIC APERTURE RADAR SIGNAL ANALYSIS METHOD, AND SYNTHETIC APERTURE RADAR SIGNAL ANALYSIS PROGRAM

(71) Applicant: NEC Corporation, Tokyo (JP)

(72) Inventors: Daisuke Ikefuji, Tokyo (JP); Taichi Tanaka, Tokyo (JP); Osamu Hoshuyama, Tokyo (JP)

(*) Notice: Subject to any disclaimer, the term of this patent is extended or adjusted under 35 U.S.C. 154(b) by 485 days.

(21) Appl. No.: 17/055,400

(22) PCT Filed: May 16, 2018

(86) PCT No.: PCT/JP2018/018948
§ 371 (c)(1),
(2) Date: Nov. 13, 2020

(87) PCT Pub. No.: WO2019/220574
PCT Pub. Date: Nov. 21, 2019

(65) Prior Publication Data
US 2021/0223389 A1     Jul. 22, 2021

(51) Int. Cl.
*G01S 13/90*     (2006.01)

(52) U.S. Cl.
CPC ...... *G01S 13/9058* (2019.05); *G01S 13/9023* (2013.01)

(58) Field of Classification Search
CPC ............ G01S 13/9023; G01S 13/9027; G01S 13/9019; G01S 13/904; G01S 13/90;
(Continued)

(56) References Cited

U.S. PATENT DOCUMENTS 5,485,384 A * 1/1996 Falconnet ............... G01S 13/86
                                                        701/445
5,659,318 A * 8/1997 Madsen ............... G01S 13/9023
                                                     342/25 C
(Continued)

FOREIGN PATENT DOCUMENTS

| CN | 104111456 A | 10/2014 |
|----|-------------|---------|
| CN | 108153979 A | 6/2018 |

(Continued)

OTHER PUBLICATIONS

Veronica Tofani et al., "Persistent Scatterer Interferometry (PSI) Technique for Landslide Characterization and Monitoring" Remote Sensing, Mar. 1, 2013, vol. 5, No. 3, pp. 1045-1065, ISSN:2072-4292.

(Continued)

*Primary Examiner* — Olumide Ajibade Akonai
(74) *Attorney, Agent, or Firm* — Sughrue Mion, PLLC

(57) ABSTRACT

A synthetic aperture radar signal analysis device 20 includes: an extraction unit 21 that extracts a stable reflection point from time-series data acquired through observation, by a synthetic aperture radar, of a region to be observed from a predetermined observing direction; a generation unit 22 that generates a cluster which is a collection of stable reflection points on the basis of the extracted stable reflection point corresponding to the predetermined observing direction; an association unit 23 that associates the generated cluster corresponding to the predetermined observing direction with a structure indicated by map data corresponding to the region to be observed; and a synthesis unit 24 that performs vector-synthesis of displacement rates for a plurality of the clusters each corresponding to the observing direction associated with the structure.

20 Claims, 13 Drawing Sheets

(58) Field of Classification Search
CPC .. G01S 13/003; G01S 13/885; G01S 13/9017; G01S 13/9029; G01S 13/9058; G01S 17/89; G01S 13/9064; G01S 13/89; G01S 13/9011; G01S 13/9089; G01S 13/9082; G01S 13/426; G01S 13/9004; G01S 13/9056; G01S 13/9076; G01S 13/931; G01S 13/9052; G01S 13/9054; G01S 7/411; G06T 2207/10044; G06T 7/60
See application file for complete search history.

(56) References Cited

U.S. PATENT DOCUMENTS

| | | | | |
|---|---|---|---|---|
| 6,583,751 | B1* | 6/2003 | Ferretti | G01S 13/9023 342/25 R |
| 9,389,311 | B1* | 7/2016 | Moya | G06V 20/13 |
| 11,709,254 | B2* | 7/2023 | Tanaka | G01S 13/90 342/25 R |
| 2004/0032361 | A1* | 2/2004 | Kirscht | G01S 13/9029 342/25 R |
| 2010/0007549 | A1* | 1/2010 | Smith | G01S 13/9058 342/25 A |
| 2010/0045513 | A1* | 2/2010 | Pett | G01S 13/867 342/25 C |
| 2011/0298654 | A1* | 12/2011 | Hellsten | G01S 13/9029 342/25 A |
| 2012/0319893 | A1* | 12/2012 | Yun | G01S 13/9023 342/25 C |
| 2015/0323666 | A1 | 11/2015 | Murata | |
| 2016/0320479 | A1 | 11/2016 | Ma et al. | |
| 2018/0011187 | A1* | 1/2018 | Katayama | G01S 13/9023 |

FOREIGN PATENT DOCUMENTS

| | | |
|---|---|---|
| JP | 2011-191227 A | 9/2011 |
| JP | 2013-036978 A | 2/2013 |
| JP | 2015-215210 A | 12/2015 |
| JP | 2017-072473 A | 4/2017 |

OTHER PUBLICATIONS

T. Tanaka, and O. Hoshuyama, "Persistent Scatterer Clustering for Structure Displacement Analysis Based on Phase Correlation Network" 2017 IEEE International Geoscience and Remote Sensing Symposium (IGARSS) Dec. 4, 2017, pp. 4618-4621, ISSN:2153-7003.

International Search Report for PCT Application No. PCT/JP2018/018948, dated on Jul. 31, 2018.

Uehara, Masafumi et al., "Construction of Wide Scope Urban Scene Model using Digital Map" IEICE Technical Report, Nov. 20, 1999, vol. 99, No. 450, pp. 73-78, ISSN:0913-5685.

Kamiya, Toshiyuki et al., "Reconstruction of building block level 3D urban landscape from aerial photograph" Proceedings of the 64th National Convention of IPSJ, Mar. 12, 2002, pp. 767-770.

Hoshuyama, Osamu et al., "Persistent Scatter Clustering Using Correlation Graph for Structure Displacement Analysis" Proceedings of the 2017 IEICE General Conference: Communication 1., Mar. 7, 2017, p. 224, ISSN:1349-1369.

* cited by examiner

SYNTHETIC APERTURE RADAR SIGNAL ANALYSIS DEVICE, SYNTHETIC APERTURE RADAR SIGNAL ANALYSIS METHOD, AND SYNTHETIC APERTURE RADAR SIGNAL ANALYSIS PROGRAM

This application is a National Stage Entry of PCT/JP2018/018948 filed on May 16, 2018, the contents of all of which are incorporated herein by reference, in their entirety.

TECHNICAL FIELD

The present invention relates to a synthetic aperture radar (SAR: Synthetic Aperture Radar) signal analysis device, a synthetic aperture radar signal analysis method, and a synthetic aperture radar signal analysis program, and particularly to a synthetic aperture radar signal analysis device, a synthetic aperture radar signal analysis method, and a synthetic aperture radar signal analysis program that can automatically analyze the displacement of an object to be analyzed in the displacement analysis of time-series data in which observation results from a plurality of directions are combined.

BACKGROUND ART

Synthetic aperture radar technology is a technology to obtain an observation image equivalent to an image photographed using an antenna with a large aperture by transmitting and receiving radio waves while a flying object such as an artificial satellite or an airplane moves. Synthetic aperture radar technology is used, for example, to image ground undulations and structures by analyzing reflected waves from the ground surface.

NPL 1 describes a method for computing a two-dimensional displacement rate (hereinafter referred to as a two-dimensional displacement rate) of the ground surface or a structure on the basis of each time-series observation data which is time-series data observed from different directions by a flying object.

Further, PTL 1 describes a variation detection device for detecting a variation of the ground surface or an object by using PS-InSAR (Permanent/Persistent Scatters Interferometric Synthetic Aperture Radar) technology.

The displacement rate is the variation amount (displacement amount) of the ground surface and structures during the observation period. The displacement of the ground surface is, for example, the rise or subsidence of the ground. The displacement of the structure is, for example, inclination or deformation of a road or a building.

When two or more time-series observation data observed from different directions are prepared, a two-dimensional analysis (hereinafter referred to as a two-dimensional displacement analysis) of displacement of a structure can be performed. Further, in the two-dimensional displacement analysis, the two-dimensional displacement rates obtained based on two or more time-series observation data observed from different directions can be separated into east-west rate and north-south rate.

In a general two-dimensional displacement analysis, a plurality of displacement rates computed on the basis of respective time-series observation data obtained when a flying object observes an identical observation point from different directions at the same time are vector-synthesized. FIG. 18 is a block diagram showing a configuration example of a general synthetic aperture radar signal analysis device.

The synthetic aperture radar signal analysis device 900 shown in FIG. 18 includes a displacement analysis unit 910, an interpolation processing unit 920, and a displacement rate synthesis unit 930.

The displacement analysis unit 910 has a function of performing displacement analysis on time-series observation data. The displacement analysis unit 910 obtains a stable reflection point and a displacement rate of the stable reflection point by performing displacement analysis on time-series observation data observed from each input direction.

The displacement rate obtained by the displacement analysis unit 910 is a one-dimensional displacement rate (hereinafter referred to as a one-dimensional displacement rate) along the observing direction of each time-series observation data. The stable reflection point obtained by the displacement analysis unit 910 is a reflection point (scatterer) having high coherence (coherence) at least during an observation period and stably having a large reflection intensity of a signal.

As the displacement analysis method, the displacement analysis unit 910 can use a method called PSI (Persistent Scatterer Interferometry) described in, for example, NPL 1. PSI is a method of extracting a stable reflection point in time-series observation data and computing the displacement rate of the extracted reflection point.

The interpolation processing unit 920 has a function of computing the displacement rates of all the pixels in each observing direction on the basis of the displacement rate of the stable reflection point obtained by the displacement analysis. The interpolation processing unit 920 computes the displacement rates of all the pixels by interpolating the displacement rates of the stable reflection points, for example.

The displacement rate synthesis unit 930 has a function of computing a three-dimensional displacement rate (hereinafter referred to as a three-dimensional displacement rate) of each pixel by vector-synthesizing the displacement rates of the pixels in each observation image corresponding to the same coordinates. In other words, the two-dimensional displacement analysis method can be easily extended to the three-dimensional displacement analysis method by utilizing three or more time-series observation data observed from different directions.

The operation of computing the three-dimensional displacement rate of the synthetic aperture radar signal analysis device 900 will be described below with reference to FIG. 19. FIG. 19 is a flowchart showing the operation of the displacement rate computation process by the synthetic aperture radar signal analysis device 900.

The displacement analysis unit 910 uses time-series observation data observed from each direction as input data. The displacement analysis unit 910 then performs displacement analysis on the input data for each observing direction (step S910). The displacement analysis unit 910 inputs the result of displacement analysis indicating the displacement rate of the stable reflection point to the interpolation processing unit 920.

The interpolation processing unit 920 then computes the displacement rates of all the pixels in each observing direction on the basis of the inputted result of the displacement analysis.

For example, the interpolation processing unit 920 performs interpolation on the computed displacement rate of the stable reflection point to obtain the displacement rate of each pixel (step S920). The interpolation processing unit 920 inputs the computed displacement rates of all the pixels to the displacement rate synthesis unit 930.

The displacement rate synthesis unit 930 then computes the three-dimensional displacement rate of each pixel by vector-synthesizing the displacement rates of the pixels in each observation image corresponding to the same coordinates (step S930). Note that the displacement rate synthesis unit 930 may compute the two-dimensional displacement rate of each pixel.

The displacement rate synthesis unit 930 then outputs the computed displacement rate as an analysis result. After the output, the synthetic aperture radar signal analysis device 900 ends the displacement rate computation process.

Further, PTL 2 describes a target detection device for detecting an object existing around a vehicle, which reduces the frequency of erroneous recognition of a wall-shaped stationary object as a moving object.

Further, PTL 3 describes an object recognition device capable of improving recognition accuracy for discriminating and recognizing, for example, a vehicle, a motorbike, a bicycle, or a person (pedestrian) from a detection pattern of reflection of an on-vehicle radar.

In addition, NPL 2 describes a specific method of clustering stable reflection points extracted for each observing direction on the basis of the coordinates and phases of the stable reflection points.

CITATION LIST

Patent Literature

PTL 1: Japanese Laid-Open Patent Publication No. 2015-215210
PTL 2: Japanese Laid-Open Patent Publication No. 2013-036978
PTL 3: Japanese Laid-Open Patent Publication No. 2011-191227

Non Patent Literature

NPL 1: Veronica Tofani et al., "Persistent Scatterer Interferometry (PSI) Technique for Landslide Characterization and Monitoring," Remote Sens. 2013, 5, pp. 1045-1065.
NPL 2: T. Tanaka, and O. Hoshuyama, "Persistent Scatterer Clustering for Structure Displacement Analysis Based on Phase Correlation Network," IEEE IGARSS 2017, pp. 4618-4621, 2017.

SUMMARY OF INVENTION

Technical Problem

The synthetic aperture radar signal analysis device 900 shown in FIG. 18 interpolates the displacement rate of the stable reflection point obtained by performing displacement analysis on input data corresponding to each observing direction, and computes the three-dimensional displacement rate for each pixel.

In the computation method described above, the displacement rate of each structure tends to be mixed with the displacement rate of the boundary portion between the ground and the building, for example. In other words, obtaining an accurate three-dimensional displacement rate is difficult for the synthetic aperture radar signal analysis device 900.

In addition, when positional deviation (coordinate error) occurs at the stable reflection points obtained in each observing direction, the displacement rates of the reflection points corresponding to the respective different structures are vector-synthesized even if the coordinate spaces are the same. In other words, obtaining an accurate three-dimensional displacement rate is difficult when the positional deviation occurs.

Further, in order to avoid the occurrence of errors due to the positional deviation of the stable reflection points, manually associating the structure indicated by the map with a large number of stable reflection points is required. In other words, when the occurrence of errors due to the positional deviation is avoided, the operator spends much time and other costs.

As a solution for solving the above problem, a means for extracting a stable reflection point corresponding to a predetermined observing direction from time-series data observed from a predetermined observing direction by a synthetic aperture radar, clustering the extracted stable reflection point, and associating each cluster with a structure indicated by map data can be considered.

The above-mentioned solution computes the displacement rate of the stable reflection point, extracts a cluster associated with the structure to be analyzed, and computes a three-dimensional displacement rate by vector-synthesizing the displacement rate along the observing direction of each extracted cluster. However, even if the techniques described in PTLs 1 to 3 and NPLs 1 to 2 are combined, the above-mentioned solution is not contemplated.

[Purpose of Invention]

Accordingly, it is an object of the present invention to provide a synthetic aperture radar signal analysis device, a synthetic aperture radar signal analysis method, and a synthetic aperture radar signal analysis program that can perform a three-dimensional displacement analysis of a structure with higher accuracy on the basis of each observation data observed from different directions by a synthetic aperture radar, which solve the above problems.

Solution to Problem

The synthetic aperture radar signal analysis device according to the present invention includes: an extraction unit which extracts a stable reflection point from time-series data acquired through observation, by a synthetic aperture radar, of a region to be observed from a predetermined observing direction; a generation unit which generates a cluster which is a collection of stable reflection points on the basis of the extracted stable reflection point corresponding to the predetermined observing direction; an association unit which associates the generated cluster corresponding to the predetermined observing direction with a structure indicated by map data corresponding to the region to be observed; and a synthesis unit which performs vector-synthesis of displacement rates for a plurality of the clusters each corresponding to the observing direction associated with the structure.

The synthetic aperture radar signal analysis method according to the present invention includes: extracting a stable reflection point from time-series data acquired through observation, by a synthetic aperture radar, of a region to be observed from a predetermined observing direction; generating a cluster which is a collection of stable reflection points on the basis of the extracted stable reflection point corresponding to the predetermined observing direction; associating the generated cluster corresponding to the predetermined observing direction with a structure indicated by map data corresponding to the region to be observed; and performing vector-synthesis of displacement rates for a plurality of the clusters each corresponding to the observing direction associated with the structure.

The synthetic aperture radar signal analysis program according to the present invention causes a computer to execute: an extraction process of extracting a stable reflection point from time-series data acquired through observation, by a synthetic aperture radar, of a region to be observed from a predetermined observing direction; a generation process of generating a cluster which is a collection of stable reflection points on the basis of the extracted stable reflection point corresponding to the predetermined observing direction; an association process of associating the generated cluster corresponding to the predetermined observing direction with a structure indicated by map data corresponding to the region to be observed; and a synthesis process of performing vector-synthesis of displacement rates for a plurality of the clusters each corresponding to the observing direction associated with the structure.

Advantageous Effects of Invention

The present invention can perform a three-dimensional displacement analysis of a structure with higher accuracy on the basis of each observation data observed from different directions by the synthetic aperture radar.

DESCRIPTION OF EMBODIMENTS

First Exemplary Embodiment

[Description of Configuration]

Figure 1:
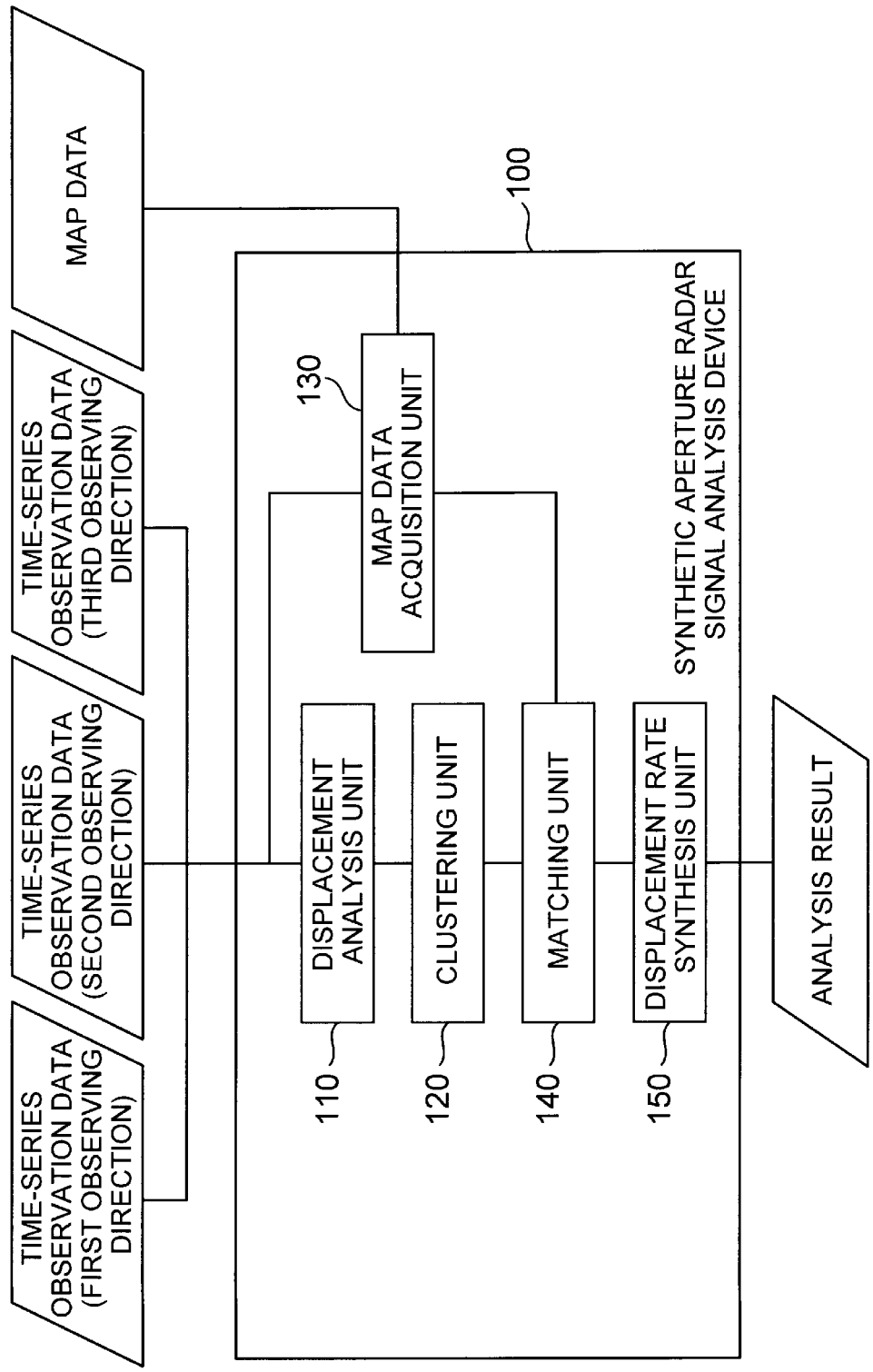
FIG. 1 is a block diagram showing a configuration example of a first exemplary embodiment of a synthetic aperture radar signal analysis device according to the present invention.

Exemplary embodiments of the present invention will now be described with reference to the drawings. FIG. 1 is a block diagram showing a configuration example of a first exemplary embodiment of a synthetic aperture radar signal analysis device according to the present invention.

The synthetic aperture radar signal analysis device 100 of the present exemplary embodiment can automatically perform a three-dimensional displacement analysis of a structure to be analyzed on the basis of each observation data observed from different directions by the synthetic aperture radar. The structures to be analyzed are, for example, buildings and roads existing in the region to be observed.

The synthetic aperture radar signal analysis device 100 of the present exemplary embodiment can perform a highly accurate three-dimensional displacement analysis on the basis of each observation data observed from different directions by the synthetic aperture radar.

As shown in FIG. 1, the synthetic aperture radar signal analysis device 100 of the present exemplary embodiment includes a displacement analysis unit 110, a clustering unit 120, a map data acquisition unit 130, a matching unit 140, and a displacement rate synthesis unit 150.

As shown in FIG. 1, the displacement analysis unit 110, the clustering unit 120, the map data acquisition unit 130, the matching unit 140, and the displacement rate synthesis unit 150 are connected so as to be communicable with each other so that data can be inputted and outputted.

The synthetic aperture radar signal analysis device 100 according to the present exemplary embodiment is a device that automatically executes two-dimensional displacement analysis or three-dimensional displacement analysis of a structure on the basis of time-series data observed from different observing directions. The synthetic aperture radar signal analysis device 100 associates a structure indicated by map data with a cluster, and automatically performs vector synthesis on the basis of the result of the association.

The displacement analysis unit 110 receives, as input, time-series observation data observed from different observing directions by the synthetic aperture radar. The displacement analysis unit 110 has a function of extracting a stable reflection point from the inputted time-series observation data and computing the displacement rate of the extracted stable reflection point.

In the example shown in FIG. 1, three types of time-series observation data observed from a first observing direction, a second observing direction, and a third observing direction are inputted to the displacement analysis unit 110. Note that the types of the time-series observation data inputted to the displacement analysis unit 110 are not limited to three types.

The time-series observation data of the present exemplary embodiment is data including two-dimensional phase information obtained for each observation date and time. The phase is information representing the delay amount of the radar signal. For example, data represented in the form of complex numbers are used as data including phase information.

The displacement analysis unit 110 extracts a pixel obtaining a stable reflection point usable for displacement analysis from each inputted time-series observation data. The displacement analysis unit 110 then computes the displacement rate of the extracted pixel, that is, the displacement rate of the stable reflection point.

The stable reflection point has information such as phases, coordinates, and heights. Generally, many stable reflection points are extracted from points representing the outer shape (edge) of a structure such as the edge of a road or the wall surface of a building. The computed displacement rate of each stable reflection point is a one-dimensional displacement rate along the observing direction.

In the extraction of the stable reflection point and the computation of the displacement rate, the displacement analysis unit 110 utilizes, for example, the above-described PSI. The displacement analysis unit 110 inputs, for example, the extracted stable reflection points to the clustering unit 120.

The clustering unit 120 has a function of clustering the stable reflection points extracted for each observing direction on the basis of the coordinates and phases of the stable reflection points.

Performing a clustering process by the clustering unit 120 allows the stable reflection points to be grouped by corresponding structures (reflection source) such as roads, buildings, and small-area ground on which, for example, a park is constructed existing in the region to be observed.

In other words, the cluster acquired by the clustering unit 120 performing a clustering process is a set of stable reflection points grouped for each corresponding structure. Further, a cluster number of the cluster to which the cluster belongs or information for identifying the cluster is imparted to the stable reflection point through the clustering process.

As a specific method for performing clustering, the clustering unit 120 can use a method described in, for example, NPL 2. The clustering unit 120 inputs the acquired cluster to the matching unit 140.

As shown in FIG. 1, map data including information indicating the outer shape of a structure such as a road or a building, and time-series observation data is inputted to the map data acquisition unit 130. The map data acquisition unit 130 has a function of acquiring, from the inputted map data, a map image indicating the same area as the region to be observed indicated by the inputted time-series observation data.

In the map data of the present exemplary embodiment, information indicating the outer shape of a structure such as a road or a building, and information for identifying the structure such as an identification number are provided for each structure. The map data acquisition unit 130 inputs the acquired map image to the matching unit 140.

The matching unit 140 has a function of associating a cluster corresponding to each observing direction obtained by the clustering unit 120 with a structure indicated by the inputted map image.

The matching unit 140 may record the result of the association by, for example, recording the cluster number of the cluster associated with the structure indicated by the map image. After recording, the matching unit 140 extracts a cluster associated with the structure to be analyzed indicated by the map image. Note that a plurality of clusters may be associated with the structure indicated by the map image.

As a method of associating each cluster with the structure indicated by the map image, for example, there is a method of associating the shape of the edge formed at the stable reflection point constituting each cluster with the shape of the edge of the structure indicated by the map data by image pattern matching. Hereinafter, an edge formed at a stable reflection point constituting a cluster is referred to as a cluster edge, and an edge of a structure indicated by map data is referred to as a structure edge.

Figure 2:
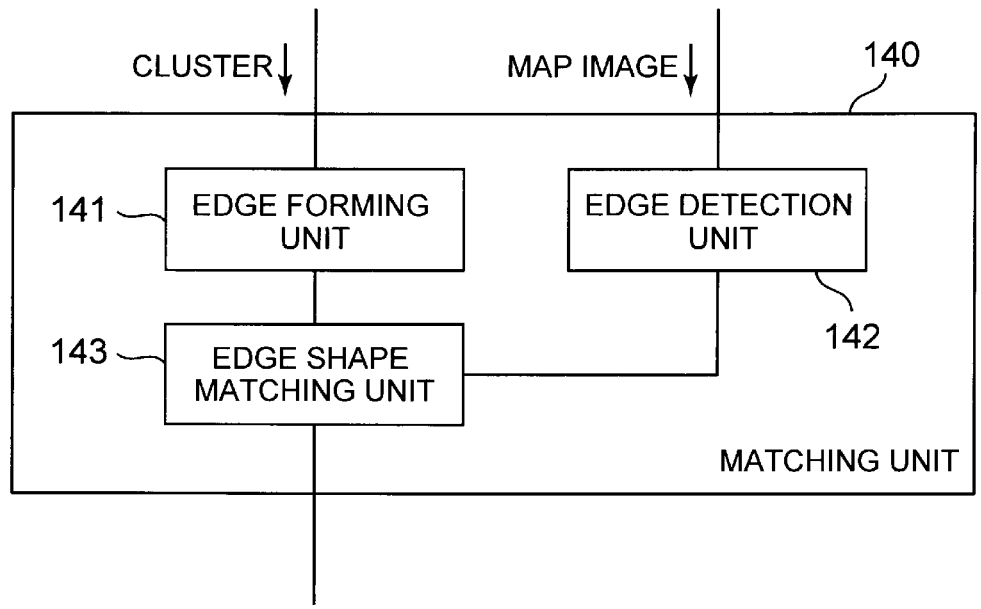
FIG. 2 is a block diagram showing a configuration example of a matching unit 140.

FIG. 2 is a block diagram showing a configuration example of the matching unit 140. The matching unit 140 shown in FIG. 2 associates each cluster with the structure indicated by the map image by the above-described association method.

As shown in FIG. 2, the matching unit 140 includes an edge forming unit 141, an edge detection unit 142, and an edge shape matching unit 143.

The edge forming unit 141 has a function of forming a cluster edge by connecting pixels indicating stable reflection points constituting the cluster. The formed cluster edge corresponds to a predetermined observing direction. The edge forming unit 141 inputs the formed cluster edge to the edge shape matching unit 143.

The edge detection unit 142 has a function of detecting the edge of the structure indicated by the map data and then forming the structure edge. The edge detection unit 142 inputs the formed structure edge to the edge shape matching unit 143.

The edge shape matching unit 143 has a function of associating a cluster constituting a cluster edge with a structure indicated by a map image constituting a structure edge.

The edge shape matching unit 143, for example, performs pattern matching based on two-dimensional cross-correlation for the shape of the formed cluster edge and the shape of the formed structure edge, thereby acquiring a cross-correlation coefficient.

The edge shape matching unit 143 then associates the cluster constituting the cluster edge with the structure indicated by the map image constituting the structure edge when the maximum cross-correlation coefficient among the acquired cross-correlation coefficients is acquired.

Note that the edge shape matching unit 143 may associate each cluster with the structure indicated by the map image by a method other than the association method based on the edge shape.

The displacement rate synthesis unit 150 computes a one-dimensional displacement rate along each observing direction of an object to be analyzed on the basis of each cluster associated with the object to be analyzed. The displacement rate synthesis unit 150 then computes a three-dimensional displacement rate of an object to be analyzed by vector-synthesizing the each computed one-dimensional displacement rate.

When the one-dimensional displacement rate is computed on the basis of the cluster, the displacement rate synthesis unit 150 computes, for example, an average value of the displacement rates of the stable reflection points constituting the cluster. When the observing direction is only two directions, the displacement rate synthesis unit 150 computes a displacement rate on a plane in a three-dimensional space composed of two displacement rate vectors.

In addition, when the observing directions are four or more directions, the displacement rate synthesis unit 150 computes the most consistent three-dimensional displacement rate on the basis of the one-dimensional displacement rate of the object to be analyzed obtained for each observing direction by using, for example, the least-squares method.

For example, a case is considered in which a three-dimensional displacement rate of an object to be analyzed is obtained on the basis of observation results from three different directions. Assuming that each displacement rate of the structure to be analyzed along a first observing direction, a second observing direction, and a third observing direction is $(v_1, v_2, v_3)$, the three-dimensional displacement rate $v=(v_x, v_y, v_z)^T$ is represented as follows.

[Expression 1]

$$v = N^{-1} \cdot (v_1, v_2, v_3)^T \quad \text{Expression (1)}$$

Note that N in Expression (1) is defined as follows using the incident angles $(\theta_1, \theta_2, \theta_3)$ of the synthetic aperture radar in the first observing direction, the second observing direction, and the third observing direction, and the azimuth angles $(\varphi_1, \varphi_2, \varphi_3)$ in the first observing direction, the second observing direction, and the third observing direction.

[Expression 2]

$$N = \begin{pmatrix} \cos\varphi_1 \sin\theta_1 & \sin\varphi_1 \sin\theta_1 & \cos\theta_1 \\ \cos\varphi_2 \sin\theta_2 & \sin\varphi_2 \sin\theta_2 & \cos\theta_2 \\ \cos\varphi_3 \sin\theta_3 & \sin\varphi_3 \sin\theta_3 & \cos\theta_3 \end{pmatrix} \quad \text{Expression (2)}$$

As each displacement rate $(v_1, v_2, v_3)$ of the structure, for example, an average value of the displacement rates of the clusters corresponding to each observing direction associated with the structure to be analyzed may be used. The value such as the average value of the displacement rates of the stable reflection points constituting each cluster, or the median value may be used as the average value of the displacement rate of each cluster. The displacement rate synthesis unit 150 outputs the computed displacement rate of the object to be analyzed as an analysis result.

An example of the association process by the synthetic aperture radar signal analysis device 100 of the present exemplary embodiment will be described below with reference to FIGS. 3 to 8. Note that, for the sake of simplification of explanation, in this example, the association process based on each data observed from two different directions will be described.

Figure 3:
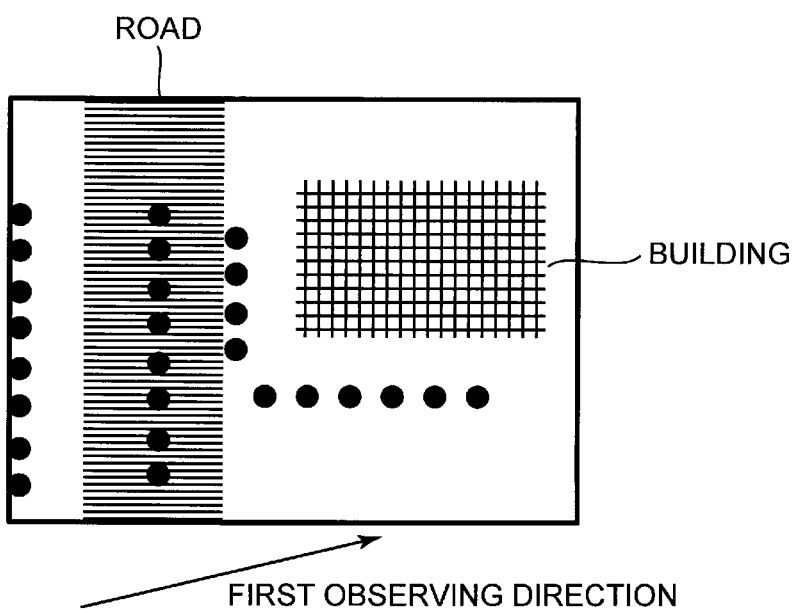
FIG. 3 is an explanatory diagram showing a position where a stable reflection point is detected when observed from a first observing direction.

FIG. 3 is an explanatory diagram showing a position where a stable reflection point is detected when observed from the first observing direction. In addition, FIG. 4 is an explanatory diagram showing a position where a stable reflection point is detected when observed from the second observing direction.

Figure 4:
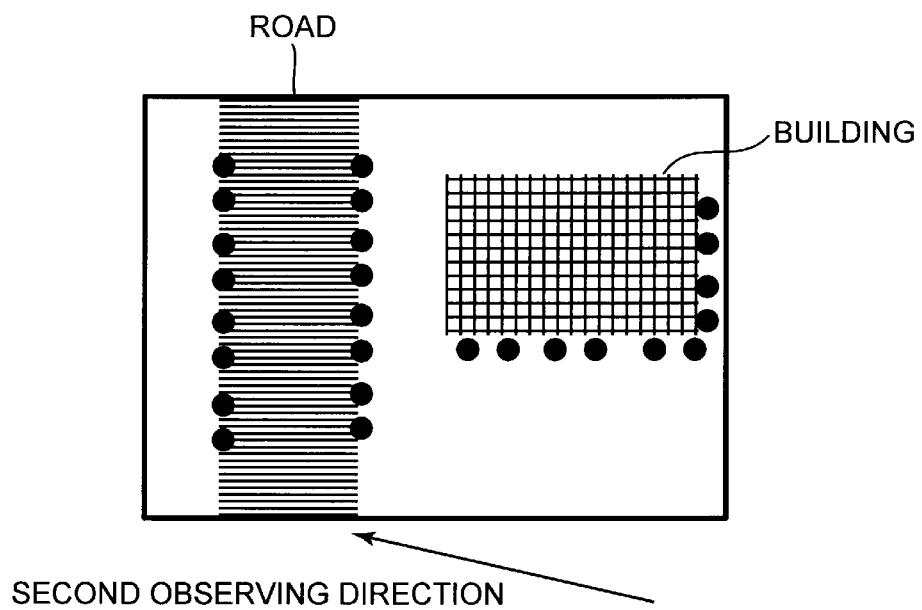
FIG. 4 is an explanatory diagram showing a position where a stable reflection point is detected when observed from a second observing direction.

FIGS. 3 to 4 show points where roads and buildings indicated by the map data exist. The areas with horizontal lines shown in FIGS. 3 to 4 represent roads. In addition, the grid-marked areas shown in FIGS. 3 to 4 represent buildings. Further, the black circles shown in FIGS. 3 to 4 represent stable reflection points. Note that the meanings of the expressions shown in FIGS. 3 to 4 are the same in FIGS. 5 to 8.

As shown in FIGS. 3 to 4, stable reflection points are detected along the shape of the road or structure. Note that the stable reflection point shown in FIG. 3 is an example of a stable reflection point detected with a positional deviation.

Figure 5:
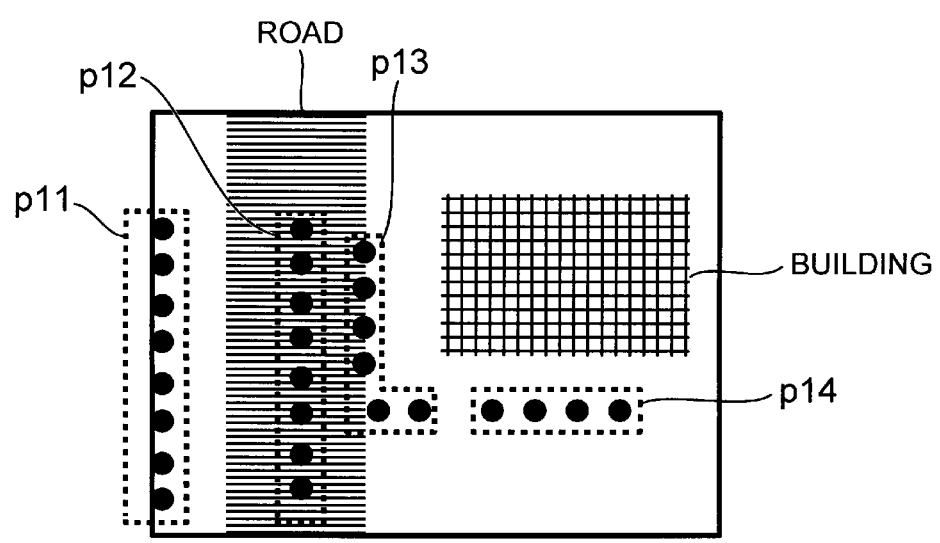
FIG. 5 is an explanatory diagram showing a clustering result of stable reflection points detected when observed from the first observing direction.

FIG. 5 is an explanatory diagram showing a clustering result of stable reflection points detected when observed from the first observing direction. Clusters p11 and p12 shown in FIG. 5 correspond to the edges of the road. Clusters p13 and p14 shown in FIG. 5 correspond to the edges of the building.

Figure 6:
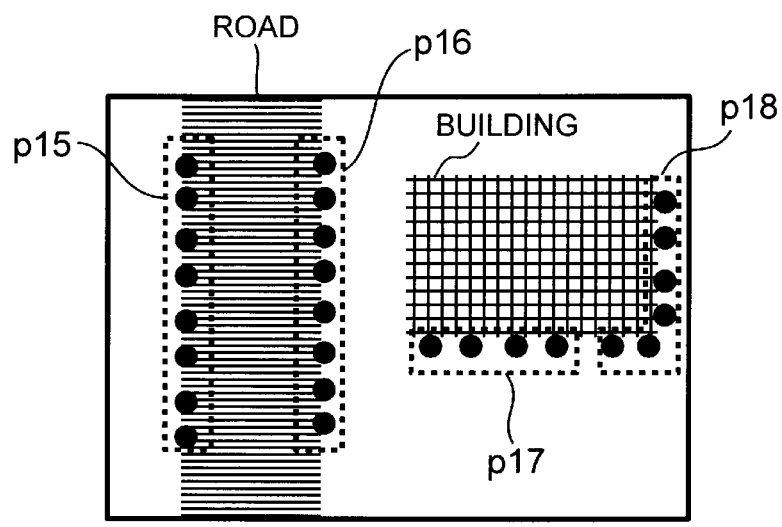
FIG. 6 is an explanatory diagram showing a clustering result of stable reflection points detected when observed from the second observing direction.

FIG. 6 is an explanatory diagram showing a clustering result of stable reflection points detected when observed from the second observing direction. Clusters p15 and p16 shown in FIG. 6 correspond to the edges of the road. Clusters p17 and p18 shown in FIG. 6 correspond to the edges of the building.

As shown in FIGS. 5 to 6, for example, when a displacement analysis of a road is performed, the clusters p12, p13, p15, and p16 are extracted as clusters superimposed on the road. However, the cluster p13 using the building as a reflection source is also extracted as a cluster superimposed on the road.

When the displacement rate of the road including the cluster p13 is computed, an error is included in the computed displacement rate of the road. When the corresponding cluster is manually selected so that the displacement rate does not contain an error, the selecting operation becomes a time-consuming operation.

Therefore, the edge forming unit 141 of the matching unit 140 of the present exemplary embodiment forms cluster edges on the basis of, for example, clusters as shown in FIGS. 5 to 6. The edge shape matching unit 143 automatically extracts a cluster corresponding to the structure to be analyzed by executing pattern matching between the formed cluster edge and the structure edge indicated by the map image.

Figure 7:
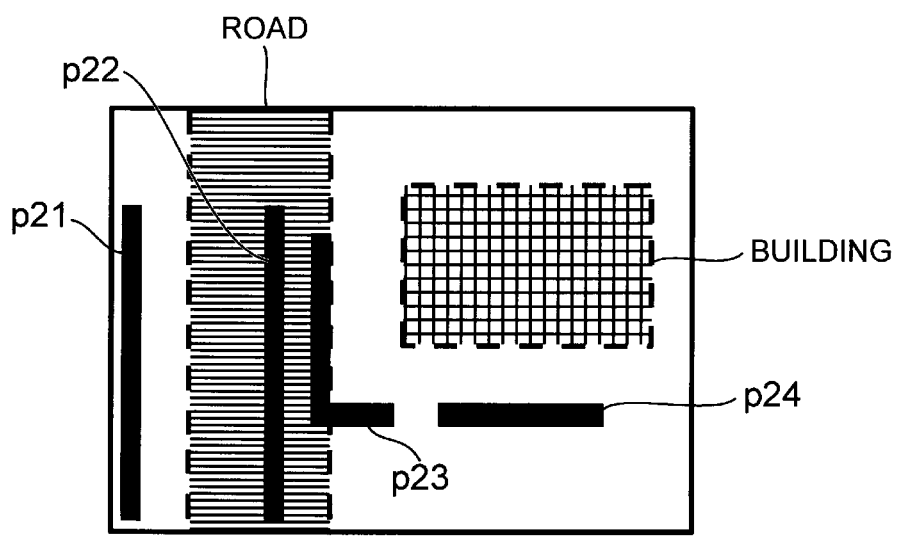
FIG. 7 is an explanatory diagram showing cluster edges composed of stable reflection points detected when observed from the first observing direction.

FIG. 7 is an explanatory diagram showing cluster edges composed of stable reflection points detected when observed from the first observing direction. Cluster edges p21, p22, p23, and p24 shown in FIG. 7 are cluster edges formed on the basis of the clusters p11, p12, p13, and p14, respectively.

Figure 8:
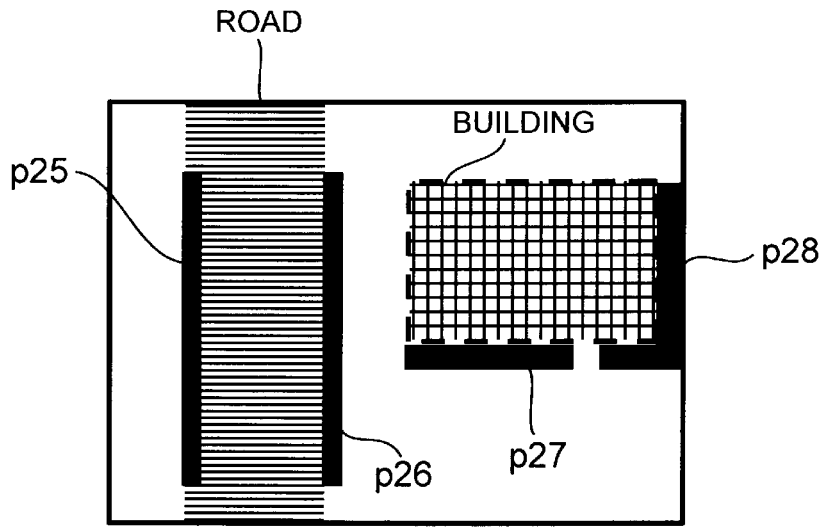
FIG. 8 is an explanatory diagram showing cluster edges composed of stable reflection points detected when observed from the second observing direction.

FIG. 8 is an explanatory diagram showing cluster edges composed of stable reflection points detected when observed from the second observing direction. Cluster edges p25, p26, p27, and p28 shown in FIG. 8 are cluster edges formed on the basis of the clusters p15, p16, p17, and p18, respectively.

The broken lines on the left side shown in FIG. 7 represent the structure edges of the road. In addition, the dashed rectangles shown in FIGS. 7 to 8 represent the structure edges of the building. It is found that the cluster edge p23 coincides with a part of the structure edge of the building by executing a process such as pattern matching.

Therefore, the edge shape matching unit 143 associates the cluster p13 with the building. Executing the edge shape matching process described above allows the synthetic aperture radar signal analysis device 100 of the present exemplary embodiment to more accurately compute the displacement rate of the structure to be analyzed.

[Description of Operation]

Figure 9:
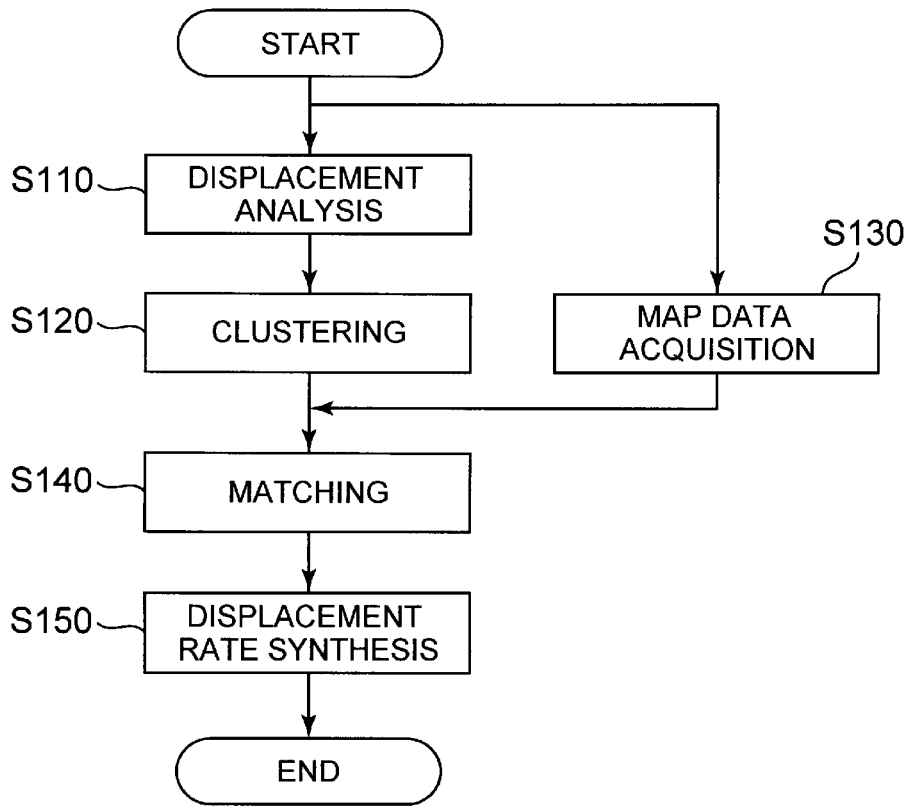
FIG. 9 is a flowchart showing the operation of the displacement rate computation process by a synthetic aperture radar signal analysis device 100 of a first exemplary embodiment.

The operation of computing the displacement rate of the object to be analyzed by the synthetic aperture radar signal analysis device 100 of the present exemplary embodiment will be described below with reference to FIG. 9. FIG. 9 is a flowchart showing the operation of the displacement rate computation process by the synthetic aperture radar signal analysis device 100 of the first exemplary embodiment.

The displacement analysis unit 110 first receives, as input, time-series observation data observed from different observing directions by the synthetic aperture radar. The displacement analysis unit 110 then performs a displacement analysis on the inputted time-series observation data (step S110).

Specifically, the displacement analysis unit 110 extracts a stable reflection point for each time-series observation data. The displacement analysis unit 110 then computes the displacement rate of the extracted stable reflection point. The displacement analysis unit 110 then inputs, as the result of the displacement analysis, the extracted stable reflection point and the computed displacement rate to the clustering unit 120.

As described above, the time-series observation data corresponding to the predetermined observing direction is data including the amplitude and phase of each pixel. The inputted stable reflection point has information indicating, for example, phases, coordinates, and heights, in addition to the computed displacement rate. The displacement analysis unit 110 uses, for example, PSI described in NPL 1 for extracting the stable reflection point and computing the displacement rate.

The clustering unit 120 then clusters the stable reflection points extracted for each observing direction on the basis of the coordinates and phases of the stable reflection points (step S120). In the clustering process, the clustering unit 120 imparts, to each stable reflection point, information capable of discriminating a cluster to which the cluster belongs, such as a cluster number. The clustering unit 120 then inputs a cluster as a set of stable reflection points to the matching unit 140.

As described above, the clustering unit 120 can use, for example, a method described in NPL 2 as a specific method of clustering. As long as the stable reflection points are grouped for each structure, the clustering unit 120 may use a method other than the method described in NPL 2.

Independently of the processes in steps S110 to S120, the map data acquisition unit 130 receives, as inputs, map data including an outer shape information indicating the outer shape of a structure such as a road or a building, and the time-series observation data observed by the synthetic aperture radar. As described above, the identification numbers are imparted to the respective structures indicated by the map data such as roads and buildings together with the outer shape information.

The map data acquisition unit 130 then acquires, from the map data, a map image indicating the same region to be observed as that indicated by the inputted time-series observation data (step S130). The map data acquisition unit 130 then inputs the acquired map image to the matching unit 140.

The matching unit 140 then associates the cluster corresponding to the predetermined observing direction inputted in step S120 with the structure indicated by the map image inputted in step S130 (step S140). The matching unit 140 then inputs the cluster number of each cluster associated with the structure to be analyzed indicated by the map image to the displacement rate synthesis unit 150.

Note that a plurality of clusters corresponding to respective observing directions may be associated with the same structure indicated by the map image. When specifying the structure to be analyzed, the matching unit 140 specifies, for example, the identification number of the structure included in the map data.

As an example of a method for associating each cluster with the structure indicated by the map image, the edge shape matching unit 143 of the matching unit 140 performs pattern matching. For example, the edge shape matching unit 143 performs pattern matching based on two-dimensional cross-correlation for the image indicating the cluster edge obtained by the edge forming unit 141 and the image indicating the structure edge obtained by the edge detection unit 142.

Performing the pattern matching allows the matching unit 140 to associate the cluster with the structure indicated by the map image. Note that the matching unit 140 may associate each cluster with the structure indicated by the map image by a method other than the method of association based on the edge shape.

The displacement rate synthesis unit 150 then computes the one-dimensional displacement rate of the structure to be analyzed for each observing direction on the basis of the stable reflection points constituting the cluster indicated by the inputted cluster number. The displacement rate synthesis unit 150 then computes the three-dimensional displacement rate of the structure to be analyzed by vector-synthesizing the one-dimensional displacement rate along each observing direction (step S150).

The displacement rate synthesis unit 150 then outputs the computed three-dimensional displacement rate. After the output, the synthetic aperture radar signal analysis device 100 ends the displacement rate computation process.

[Description of Effects]

The synthetic aperture radar signal analysis device 100 of the present exemplary embodiment includes a displacement analysis unit 110 for extracting a stable reflection point corresponding to a predetermined observing direction from time-series observation data observed from the predetermined observing direction by the synthetic aperture radar and computes a displacement rate of the extracted stable reflection point.

The synthetic aperture radar signal analysis device 100 also includes a clustering unit 120 for grouping stable reflection points corresponding to respective observing directions for each reflection source (structure) in a region to be observed, and a map data acquisition unit 130 for acquiring map data indicating the region to be observed.

The synthetic aperture radar signal analysis device 100 also includes a matching unit 140 for extracting a cluster corresponding to a structure to be analyzed by associating a stable reflection point corresponding to each clustered observing direction with a structure indicated by map data.

The synthetic aperture radar signal analysis device 100 also includes a displacement rate synthesis unit 150 for computing the three-dimensional displacement rate of the structure to be analyzed on the basis of the extracted clusters corresponding to the respective observing directions. The above described cluster refers to a stable reflection point group grouped by the clustering unit 120 for each structure. Each cluster corresponds to an entire structure or a portion of a structure, such as a wall.

In the synthetic aperture radar signal analysis device 100 of the present exemplary embodiment, the clustering unit 120 clusters stable reflection points obtained in each observing direction, and the matching unit 140 associates the clusters in each observing direction with structures indicated by a map.

Therefore, the synthetic aperture radar signal analysis device 100 can automatically select a cluster and a stable reflection point corresponding to the structure to be analyzed to be used for the displacement rate synthesis. The displacement rate synthesis unit 150 of the synthetic aperture radar signal analysis device 100 can compute a three-dimensional displacement rate on the basis of a cluster automatically selected instead of a cluster manually selected.

Further, the synthetic aperture radar signal analysis device 100 of the present exemplary embodiment can extract a cluster corresponding to the object to be analyzed on the basis of the shape of the object to be analyzed indicated by the map and compute the three-dimensional displacement rate on the basis of the extracted cluster, even if the coordinates of the stable reflection point are wrong in the displacement analysis. Therefore, even if the positional deviation (coordinate error) of the stable reflection point exists in each observing direction, the synthetic aperture radar signal analysis device 100 can measure the three-dimensional displacement rate of the structure with higher accuracy.

Second Exemplary Embodiment

[Description of Configuration]

Figure 10:
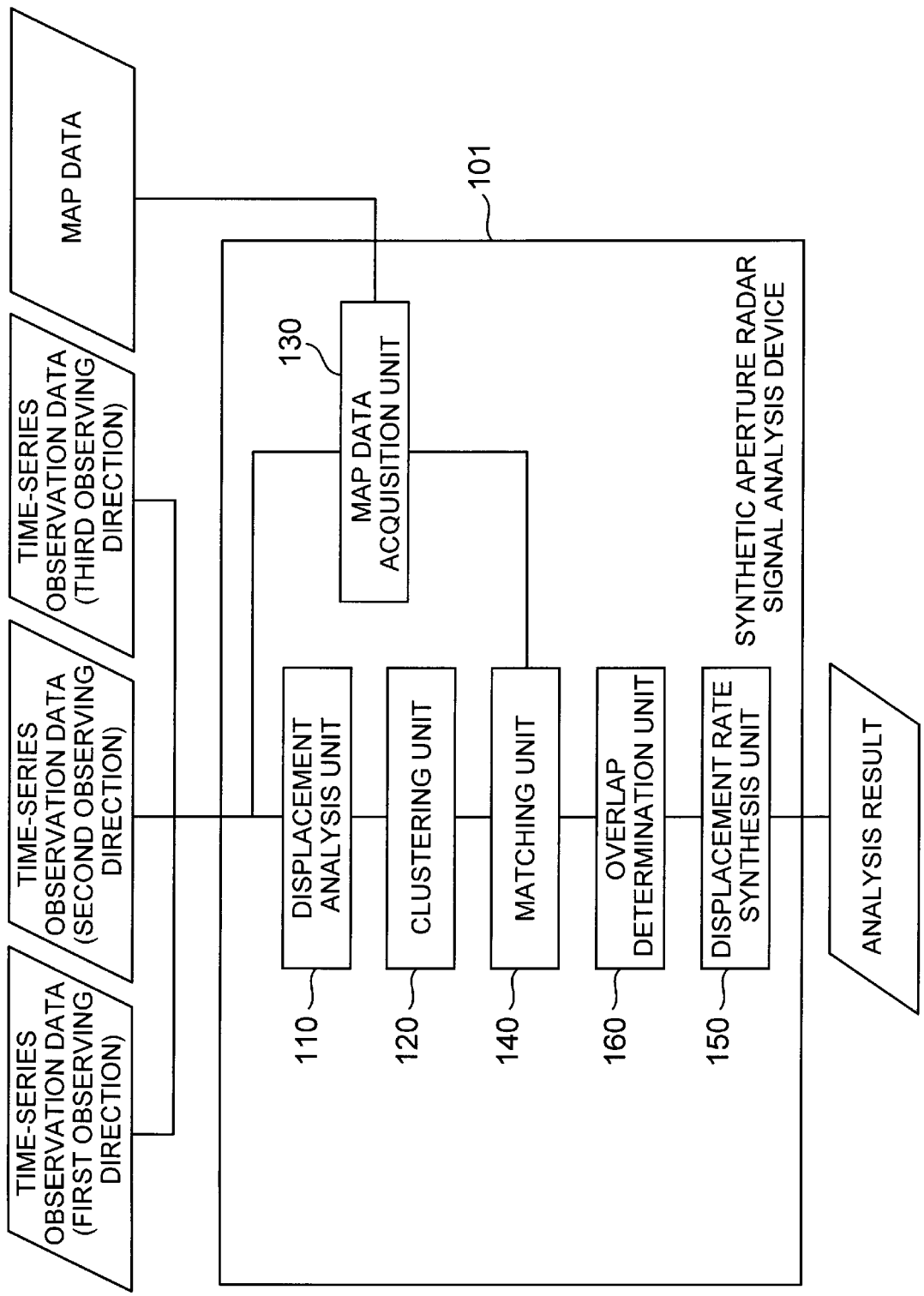
FIG. 10 is a block diagram showing a configuration example of a synthetic aperture radar signal analysis device 101 of a second exemplary embodiment.

A second exemplary embodiment of the present invention will now be described with reference to the drawings. FIG. 10 is a block diagram showing a configuration example of a synthetic aperture radar signal analysis device 101 of a second exemplary embodiment.

The synthetic aperture radar signal analysis device 101 shown in FIG. 10 differs from the synthetic aperture radar signal analysis device 100 shown in FIG. 1 in that the synthetic aperture radar signal analysis device 101 includes an overlap determination unit 160. The configuration of the synthetic aperture radar signal analysis device 101 other than the overlap determination unit 160 is the same as that of the synthetic aperture radar signal analysis device 100.

The overlap determination unit 160 of the present exemplary embodiment has a function of determining whether a cluster corresponding to each observing direction associated with an object to be analyzed indicated by the map image in the matching unit 140 overlaps in the two-dimensional image.

When the clusters extracted from the observation images observed from at least two different directions overlap each other, for example, the overlap determination unit 160 inputs the cluster numbers of the respective clusters to the displacement rate synthesis unit 150.

As a method for determining the presence or absence of overlap of clusters, the overlap determination unit 160 may use, for example, a method for determining that the clusters overlap if the edges of the clusters corresponding to each observing direction associated with the object to be analyzed indicated by the map data or the regions of the clusters overlap even partially.

When the overlap of clusters is confirmed, for example, if the number of pixels to be overlapped is greater than or equal to a predetermined ratio of the total number of pixels in both cluster regions, the overlap determination unit 160 may determine that the clusters overlap. The predetermined ratio is, for example, 10%.

Note that the overlap determination unit 160 may determine that the clusters overlap each other if the cluster edges of the clusters associated with the object to be analyzed or the cluster regions of the clusters overlap each other even by one pixel.

The overlap determination unit 160 inputs the cluster number of each cluster determined to be overlapped to the displacement rate synthesis unit 150. The displacement rate synthesis unit 150 synthesizes the displacement rate by using only the cluster indicated by the inputted cluster number. In other words, the synthetic aperture radar signal analysis device 101 of the present exemplary embodiment performs vector synthesis on the basis of only on the points commonly observed in two or more directions.

[Description of Operation]

Figure 11:
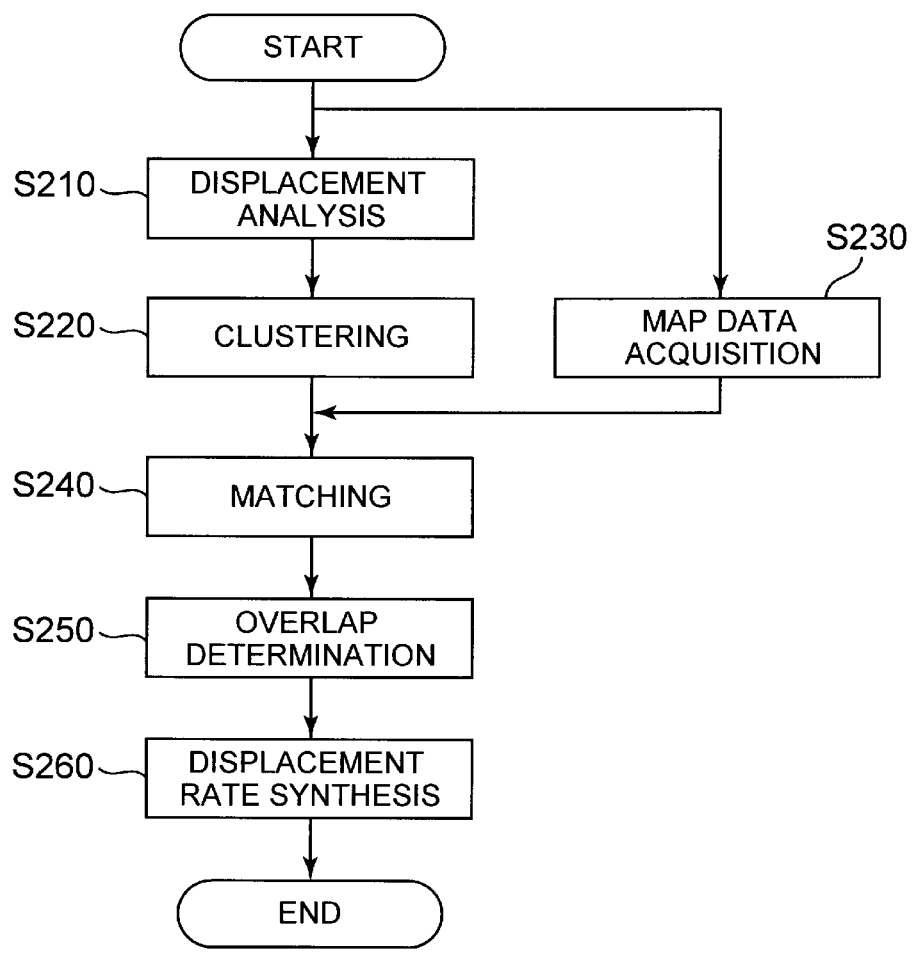
FIG. 11 is a flowchart showing the operation of the displacement rate computation process by the synthetic aperture radar signal analysis device 101 of the second exemplary embodiment.

The operation of computing the displacement rate of the object to be analyzed by the synthetic aperture radar signal analysis device 101 of the present exemplary embodiment will be described below with reference to FIG. 11. FIG. 11 is a flowchart showing the operation of the displacement rate computation process by the synthetic aperture radar signal analysis device 101 of the second exemplary embodiment.

The processes in steps S210 to S240 are the same as those in steps S110 to S140 shown in FIG. 9.

In step S240, the matching unit 140 inputs the cluster number of each cluster associated with the structure to be analyzed indicated by the map image to the overlap determination unit 160.

The overlap determination unit 160 determines whether the clusters corresponding to the respective observing directions, which are associated with the object to be analyzed indicated by the map image, overlap (step S250).

Specifically, in step S240, the matching unit 140 determines whether the clusters corresponding to the respective observing direction, which are associated with the structure to be analyzed indicated by the map image, overlap in the two-dimensional image.

As a result of the determination, when the clusters generated on the basis of the observation images observed from the plurality of directions overlap each other, the matching unit 140 inputs the cluster numbers of the respective clusters to the displacement rate synthesis unit 150.

The process in step S260 is the same as that in step S150 shown in FIG. 9.

[Description of Effects]

The overlap determination unit 160 of the present exemplary embodiment extracts each cluster corresponding to a plurality of observing directions in which overlap is confirmed from the clusters corresponding to the respective observing directions associated with the structure to be analyzed indicated by the map image. The displacement rate synthesis unit 150 computes a displacement rate on the basis of only a point always observed from two or more directions with respect to a structure to be analyzed.

In other words, since the synthetic aperture radar signal analysis device 101 of the present exemplary embodiment can synthesize the displacement rate at an identical point, the synthetic aperture radar signal analysis device 101 can obtain a more reliable displacement analysis result as compared with the synthetic aperture radar signal analysis device 100 of the first exemplary embodiment.

Third Exemplary Embodiment

[Description of Configuration]

A third exemplary embodiment of the present invention will now be described with reference to the drawings. FIG.

12 is a block diagram showing a configuration example of a synthetic aperture radar signal analysis device 102 of a third exemplary embodiment.

Figure 12:
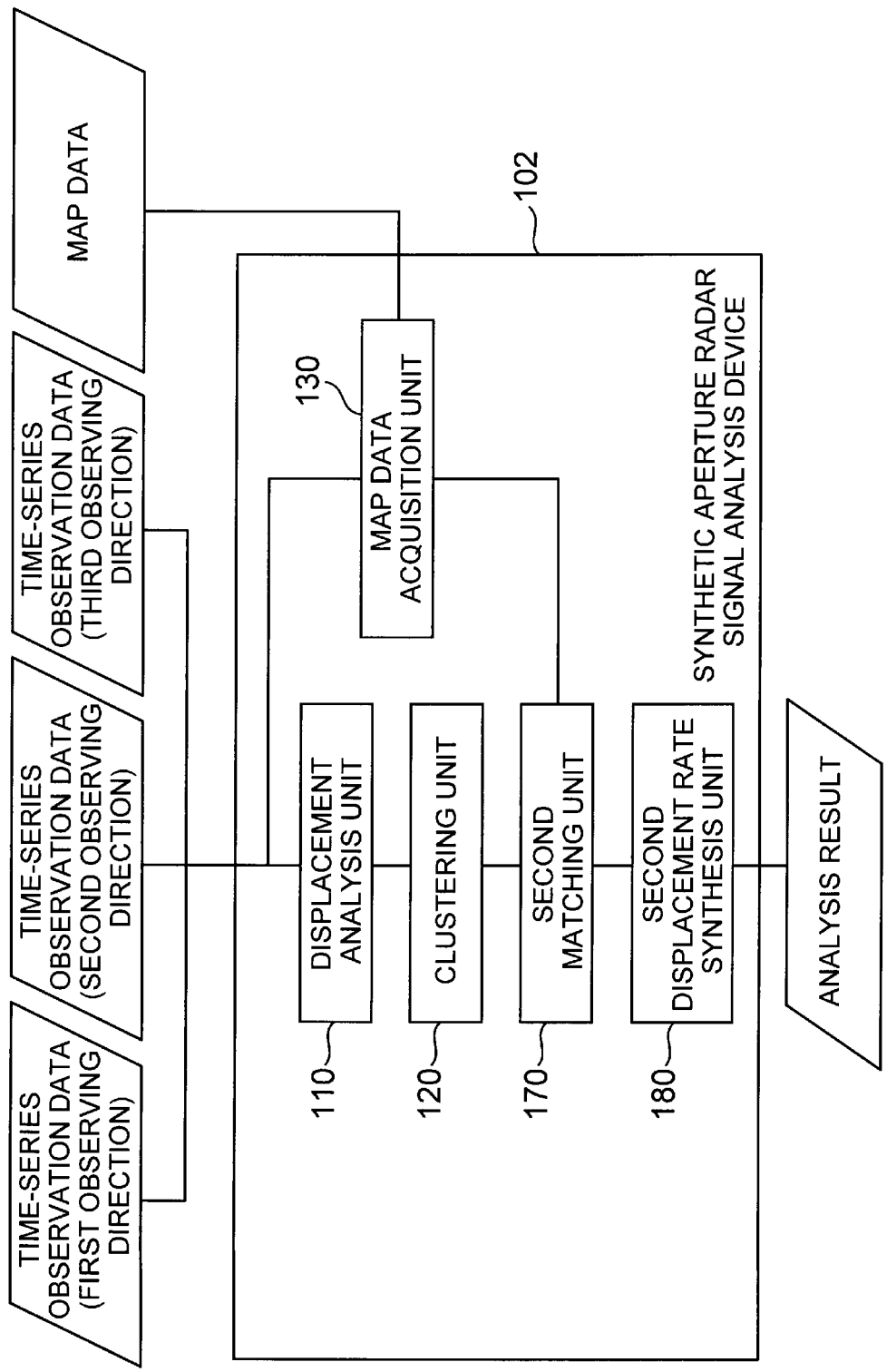
FIG. 12 is a block diagram showing a configuration example of a synthetic aperture radar signal analysis device 102 of a third exemplary embodiment.

The synthetic aperture radar signal analysis device 102 shown in FIG. 12 differs from the synthetic aperture radar signal analysis device 100 shown in FIG. 1 in that the synthetic aperture radar signal analysis device 102 includes a second matching unit 170 instead of the matching unit 140 and a second displacement rate synthesis unit 180 instead of the displacement rate synthesis unit 150. The configuration of the synthetic aperture radar signal analysis device 102 other than the second matching unit 170 and the second displacement rate synthesis unit 180 is the same as that of the synthetic aperture radar signal analysis device 100.

The synthetic aperture radar signal analysis device 102 of the present exemplary embodiment computes weights in associating clusters with structures, and uses the computed weights for vector synthesis.

The second matching unit 170 of the present exemplary embodiment has a function of determining a structure indicated by a map image to which a cluster corresponding to each observing direction is associated and computing a matching likelihood indicating the reliability of the association.

For example, the second matching unit 170 uses the cross-correlation coefficient in two-dimensional image pattern matching as the matching likelihood. The second matching unit 170 may also compare the cross-correlation coefficient with that of another structure and then compute the matching likelihood. The second matching unit 170 may also determine the matching likelihood by a method other than the above method.

The second displacement rate synthesis unit 180 of the present exemplary embodiment computes the displacement rate of the cluster on the basis of the stable reflection points constituting all the clusters having the identification numbers of the structures to be analyzed indicated by the map image.

The second displacement rate synthesis unit 180 then multiplies each of the computed displacement rate by a matching likelihood or a coefficient computed from the matching likelihood as a weight, and then performs vector synthesis to compute a three-dimensional displacement rate of an object to be analyzed. In addition, the second displacement rate synthesis unit 180 may use only the matching likelihood greater than or equal to the threshold.

An example of weighting in which matching likelihood is used will be described below. Assuming that the displacement rate of the cluster c (c=1, 2, . . . , C) corresponding to the arbitrary observing direction i associated with the object to be analyzed is $v_c$ and the matching likelihood of the cluster c is $l_c$, the displacement rate $v_i$ of the structure along the arbitrary observing direction i is represented as follows.

[Expression 3]

$$v_i = \frac{\sum_{c=1}^{C}(v_c l_c)}{\sum_{c=1}^{C} l_c} \quad \text{Expression (3)}$$

When the displacement rates are synthesized using the weights on the basis of the matching likelihood, the larger the displacement rate of the cluster having a greater degree of coincidence with the structure to be analyzed, the larger the contribution ratio to the synthesized displacement rate. Therefore, the synthetic aperture radar signal analysis device 102 can take into consideration the variation of the measurement accuracy of each stable reflection point or the variation of the measurement accuracy of each cluster, and can measure the three-dimensional displacement rate with higher accuracy.

For example, among the stable reflection points obtained in each observing direction, the stable reflection points appearing along the outer shape of the structure have less noise generally observed. Therefore, the accuracy of the displacement analysis with respect to the stable reflection point appearing along the outer shape of the structure becomes relatively high.

Similarly, the accuracy of the displacement rate of a stable reflection point belonging to a cluster having a high matching likelihood with the structure to be analyzed indicated by the map image becomes relatively high. In other words, since the displacement rates are synthesized so that the contribution ratio of the displacement rate with high accuracy becomes large, the accuracy of the computed three-dimensional displacement rate is improved.

[Description of Operation]

Figure 13:
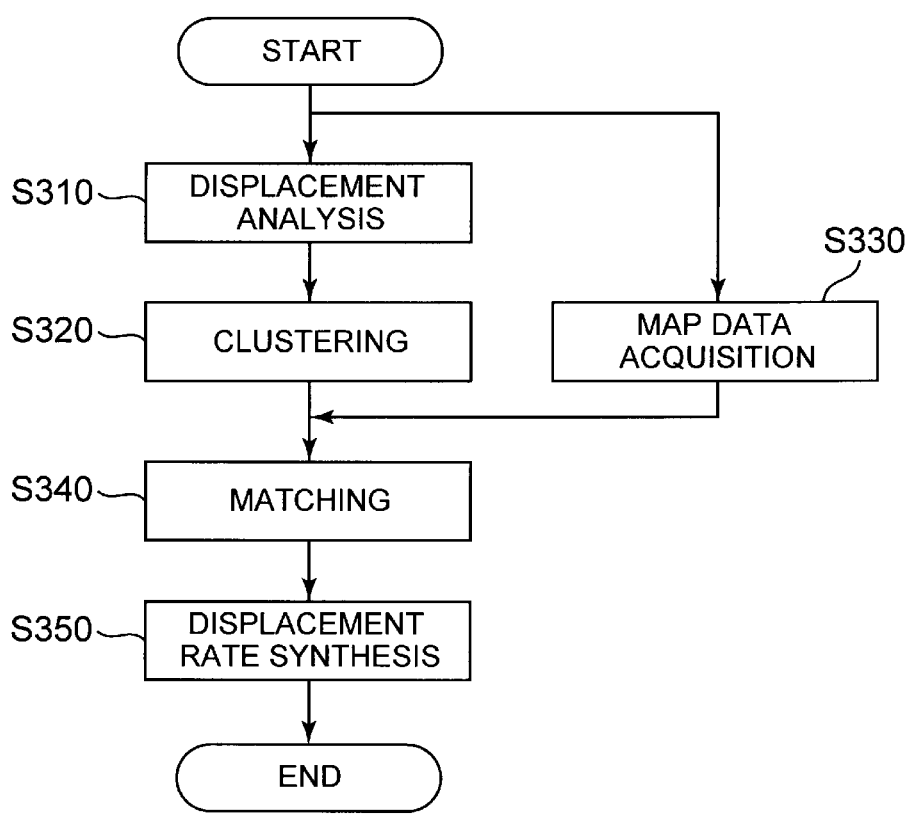
FIG. 13 is a flowchart showing the operation of the displacement rate computation process by the synthetic aperture radar signal analysis device 102 of the third exemplary embodiment.

The operation of computing the displacement rate of the object to be analyzed by the synthetic aperture radar signal analysis device 102 of the present exemplary embodiment will be described below with reference to FIG. 13. FIG. 13 is a flowchart showing the operation of the displacement rate computation process by the synthetic aperture radar signal analysis device 102 of the third exemplary embodiment.

The processes in steps S310 to S330 are the same as those in steps S110 to S130 shown in FIG. 9.

The second matching unit 170 associates a cluster corresponding to each observing direction with a structure indicated by map data (step S340). In the process in step S340, the second matching unit 170 determines the structure indicated by the map image to which the cluster corresponding to each observing direction is associated, and computes a matching likelihood indicating the reliability of the association.

The second matching unit 170 utilizes a cross-correlation coefficient in, for example, two-dimensional image pattern matching as a matching likelihood. The second matching unit 170 inputs the cluster number of the cluster corresponding to each observing direction associated with the object to be analyzed and the computed matching likelihood to the second displacement rate synthesis unit 180.

The second displacement rate synthesis unit 180 then computes the displacement rate of the cluster corresponding to the predetermined observing direction indicated by the cluster number inputted in step S340 for each cluster. The second displacement rate synthesis unit 180 then multiplies the displacement rate of the cluster by the weight based on the matching likelihood inputted in step S340, and then computes the displacement rate of the structure for each observing direction.

The second displacement rate synthesis unit 180 then computes the three-dimensional displacement rate of the object to be analyzed by vector-synthesizing the displacement rate of the structure along each observing direction (step S350). The second displacement rate synthesis unit 180 outputs the computed three-dimensional displacement rate. After the output, the synthetic aperture radar signal analysis device 102 ends the displacement rate computation process.

[Description of Effects]

The second displacement rate synthesis unit 180 of the synthetic aperture radar signal analysis device 102 of the present exemplary embodiment synthesizes the displacement rates of the clusters by using the weights based on the matching likelihood. In other words, since the displacement rates are synthesized so that the contribution ratio of the displacement rate with high accuracy becomes large, the synthetic aperture radar signal analysis device 102 can further improve the accuracy of the computed three-dimensional displacement rate.

Fourth Exemplary Embodiment

[Description of Configuration]

Figure 14:
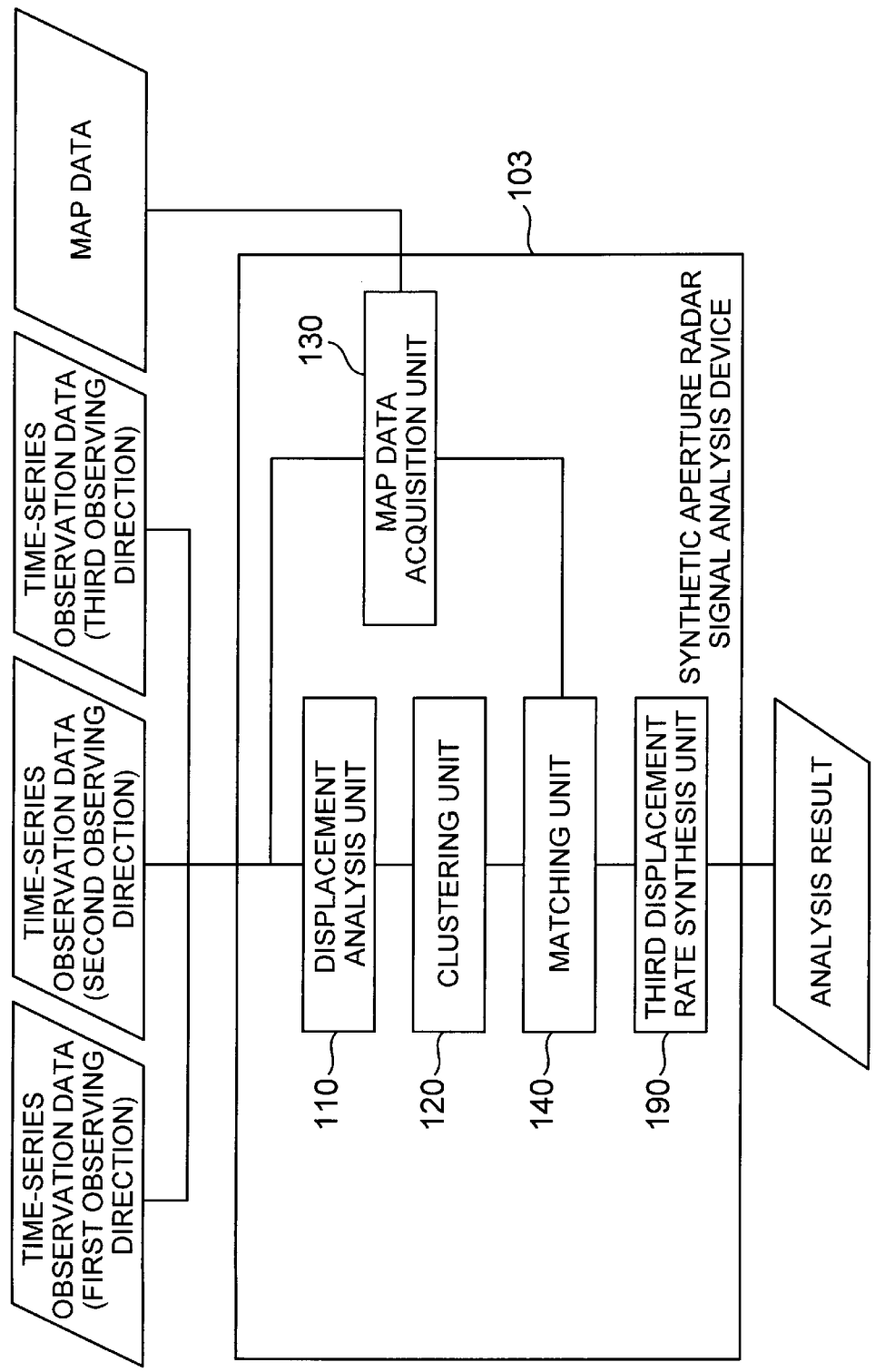
FIG. 14 is a block diagram showing a configuration example of a synthetic aperture radar signal analysis device 103 of a fourth exemplary embodiment.

A fourth exemplary embodiment of the present invention will now be described with reference to the drawings. FIG. 14 is a block diagram showing a configuration example of a synthetic aperture radar signal analysis device 103 of a fourth exemplary embodiment.

The synthetic aperture radar signal analysis device 103 shown in FIG. 14 differs from the synthetic aperture radar signal analysis device 100 shown in FIG. 1 in that the synthetic aperture radar signal analysis device 103 includes a third displacement rate synthesis unit 190 instead of the displacement rate synthesis unit 150. The configuration of the synthetic aperture radar signal analysis device 103 other than the third displacement rate synthesis unit 190 is the same as that of the synthetic aperture radar signal analysis device 100.

The third displacement rate synthesis unit 190 has a function of vector-synthesizing, for each height, the displacement rates of the clusters each corresponding to the observing direction associated with the structure to be analyzed indicated by the map data.

The stable reflection point obtained by the displacement analysis unit 110 has information indicating the phases, coordinates, and displacement rates, as well as information indicating the height. The phases at stable reflection points with different heights are different. Therefore, the clustering unit 120 can cluster the stable reflection points for each height.

The third displacement rate synthesis unit 190 then vector-synthesizes the displacement rate of the cluster for each height of the structure. The third displacement rate synthesis unit 190 outputs a three-dimensional displacement rate for each height of the structure to be analyzed obtained by vector synthesis.

Note that each cluster generated by the clustering unit 120 is composed of stable reflection points having information indicating the same height due to the nature of the process. Therefore, the third displacement rate synthesis unit 190 uses the average value of the height indicated by the information of the stable reflection points constituting the cluster as the height of the cluster.

[Description of Operation]

Figure 15:
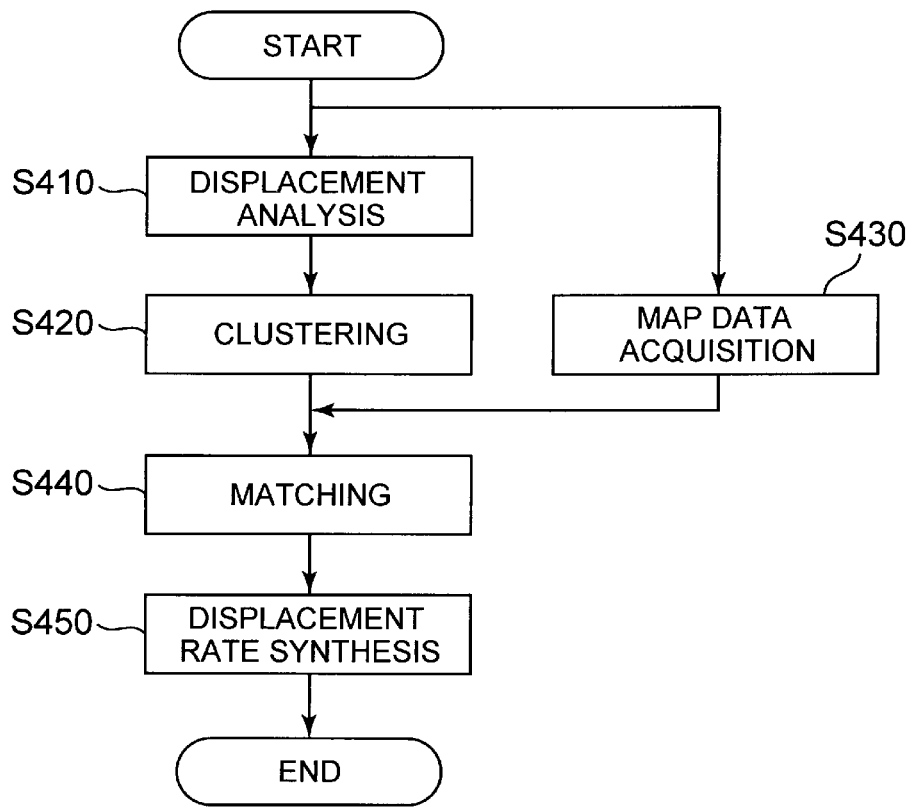
FIG. 15 is a flowchart showing the operation of the displacement rate computation process by the synthetic aperture radar signal analysis device 103 of the fourth exemplary embodiment.

The operation of computing the displacement rate of the object to be analyzed by the synthetic aperture radar signal analysis device 103 of the present exemplary embodiment will be described below with reference to FIG. 15. FIG. 15 is a flowchart showing the operation of the displacement rate computation process by the synthetic aperture radar signal analysis device 103 of the fourth exemplary embodiment.

The processes in steps S410 to S440 are the same as those in steps S110 to S140 shown in FIG. 9.

The third displacement rate synthesis unit 190 computes the displacement rate of the cluster corresponding to the predetermined observing direction inputted in step S440 for each cluster. The third displacement rate synthesis unit 190 then computes the three-dimensional displacement rate of the object to be analyzed for each height by vector-synthesizing the displacement rates of the structure along each observing direction (step S450).

When computing the three-dimensional displacement rate of the object to be analyzed for each height, the third displacement rate synthesis unit 190 selects a cluster corresponding to a predetermined observing direction for each height. In order to select clusters for each height, the third displacement rate synthesis unit 190 uses information indicating the height of the cluster obtained when the stable reflection points are extracted.

The third displacement rate synthesis unit 190 then outputs the computed three-dimensional displacement rate for each height. After the output, the synthetic aperture radar signal analysis device 103 ends the displacement rate computation process.

[Description of Effects]

The third displacement rate synthesis unit 190 of the synthetic aperture radar signal analysis device 103 of the present exemplary embodiment obtains the height of the cluster corresponding to each observing direction, and computes the three-dimensional displacement rate of the structure to be analyzed for each height. Using the computed three-dimensional displacement rate, the synthetic aperture radar signal analysis device 103 can detect or measure not only the parallel movement of the entire structure in the vertical direction, the east-west direction, and the north-south direction, but also the displacement corresponding to the height of the structure such as the inclination and falling.

The synthetic aperture radar signal analysis device of each of the exemplary embodiments extracts a stable reflection point corresponding to a predetermined observing direction from time-series observation data observed from the predetermined observing direction by the synthetic aperture radar, and computes a displacement rate of the extracted stable reflection point. The synthetic aperture radar signal analysis device then clusters the extracted stable reflection points for each structure having the same reflection source.

The synthetic aperture radar signal analysis device then acquires map data indicating a region to be observed, and associates a cluster corresponding to each observing direction with a structure indicated by map data. The synthetic aperture radar signal analysis device then computes a three-dimensional displacement rate by vector-synthesizing the displacement rate of each observing direction of the cluster associated with the structure to be analyzed. Therefore, the synthetic aperture radar signal analysis device can measure the three-dimensional displacement rate with high accuracy.

The synthetic aperture radar signal analysis device of each of the exemplary embodiments executes a process of computing a three-dimensional displacement rate by synthesizing the displacement rate of the structure to be analyzed on the basis of time-series analysis data observed from different directions by the synthetic aperture radar. When a process of computing the three-dimensional displacement rate is executed, the synthetic aperture radar signal analysis device automatically extracts the reflection point of the structure to be analyzed for each observing direction, and computes the two-dimensional displacement rate or the three-dimensional displacement rate.

Specifically, the synthetic aperture radar signal analysis device of each of the exemplary embodiments clusters the reflection points for each structure, and associates the edges of the structure indicated by the map data with the edges of each cluster, thereby extracting only the reflection points of the structure to be analyzed with high accuracy. The above processes allow the synthetic aperture radar signal analysis device of each of the exemplary embodiments to extract the reflection point of the structure to be analyzed with high accuracy and compute the two-dimensional displacement rate or the three-dimensional displacement rate.

The synthetic aperture radar signal analysis device of each of the exemplary embodiments can measure a three-dimensional displacement rate by selecting a cluster corresponding to a structure to be analyzed indicated by a map for each observing direction when performing three-dimensional displacement analysis of the structure by combining results of displacement analysis based on data observed from different directions.

Further, the synthetic aperture radar signal analysis device of each of the exemplary embodiments can compute the three-dimensional displacement rate of the object to be analyzed with high accuracy by selecting a cluster associated with the structure to be analyzed indicated by the map, even if the positional deviation occurs in each observing direction.

Note that each component in each of the above exemplary embodiments can be configured by one piece of hardware or one piece of software. Each component can also be configured by a plurality of hardware or software components. Further, a part of each component may be configured by hardware, and the other part may be configured by software.

Each function (each process) in each of the above exemplary embodiments can be implemented by a computer having a processor such as a CPU (Central Processing Unit) or a memory. For example, when a program for executing each method (each process) in each of the above exemplary embodiments is stored in a storage device (storage medium), each function is implemented by the CPU executing the program stored in the storage device. In addition, the time-series observation data and the map data may be stored in the storage device.

Figure 16:
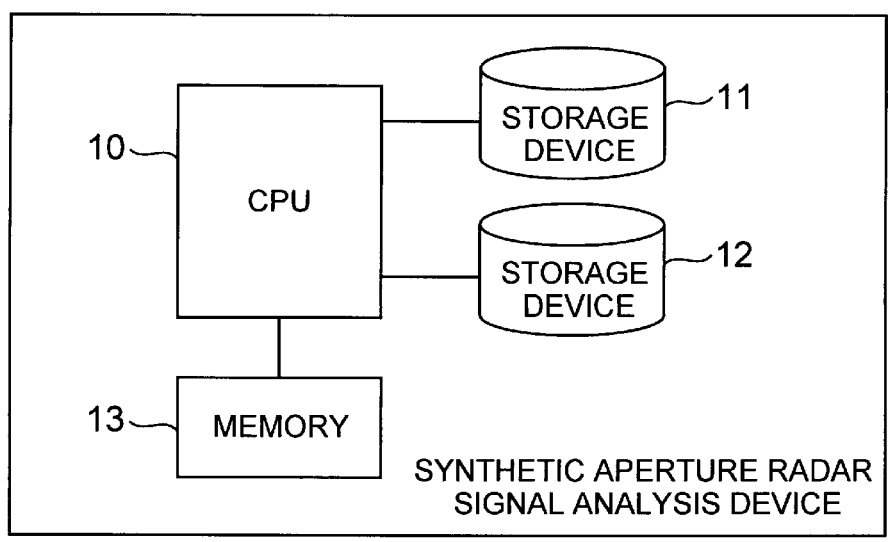
FIG. 16 is a block diagram showing a hardware configuration example of a synthetic aperture radar signal analysis device to which each of the exemplary embodiments of the present invention can be applied.

FIG. 16 is a block diagram showing a hardware configuration example of a synthetic aperture radar signal analysis device to which each of the exemplary embodiments of the present invention can be applied. FIG. 16 shows an example of a synthetic aperture radar signal analysis device of each of the exemplary embodiments implemented by a computer having a CPU.

The CPU 10 analyzes time-series observation data and map data stored in a storage device 12 according to the program stored in a storage device 11, thereby implementing each function in each of the above exemplary embodiments. Note that the storage devices 11 and 12 may be combined into one storage device.

In other words, the CPU 10 implements the functions of the displacement analysis unit 110, the clustering unit 120, the map data acquisition unit 130, the matching unit 140, the displacement rate synthesis unit 150, the overlap determination unit 160, the second matching unit 170, the second displacement rate synthesis unit 180, and the third displacement rate synthesis unit 190.

The storage devices 11 and 12 are, for example, non-transitory computer readable media (non-transitory computer readable medium). The non-transitory computer readable media include various types of tangible recording media (tangible storage medium).

Specific examples of the non-transitory computer readable media are magnetic recording media (for example, flexible disks, magnetic tapes, hard disk drives) and magneto-optical recording media (for example, a magneto-optical disk). A CD-ROM (Compact Disc-Read Only Memory), a CD-R (Compact Disc-Recordable), and a CD-R/W (Compact Disc-ReWritable) are also specific examples of the non-transitory computer readable media. Semiconductor memories such as mask ROM, PROM (Programmable ROM), EPROM (Erasable PROM) and flash ROM are also specific examples of the non-transitory computer readable media.

The programs may also be stored on various types of transitory computer readable media (transitory computer readable medium). The transitory computer readable media are supplied with a program, for example, via a wired or wireless communication path, i.e., via an electrical signal, an optical signal, or an electromagnetic wave.

A memory 13 is a storage means which temporarily stores data when the CPU 10 executes processing. The memory 13 is implemented by RAM (Random Access Memory), for example.

In addition, a configuration in which a program held by the storage device 11, the storage device 12, or a transitory computer-readable medium is transferred to the memory 13, and the CPU 10 executes processing on the basis of the program in the memory 13 may be implemented.

Note that the synthetic aperture radar signal analysis device shown in FIG. 16 may include a DSP (Digital Signal Processor) instead of the CPU 10. Alternatively, the synthetic aperture radar signal analysis device shown in FIG. 16 may include the CPU 10 and the DSP.

Note that each of the synthetic aperture radar signal analysis devices may be implemented by hardware. For example, the synthetic aperture radar signal analysis device 100 may be provided with a circuit including hardware components such as an LSI (Large Scale Integration) in which a program for implementing a function as shown in FIG. 1 is incorporated.

Some or all of the components may be implemented by a general purpose circuit (circuitry), a dedicated circuit, a processor, or any combination thereof. These components may be composed of a single chip or a plurality of chips connected via a bus. Some or all of the components may be implemented by a combination of, for example, the above-described circuit and program.

When some or all of the components are implemented by, for example, a plurality of information processing devices or circuits, the plurality of information processing devices or circuits may be centralized or distributed. For example, the information processing device or circuit may be implemented as a client and server system or a cloud computing system, each component of which is connected via a communication network.

Figure 17:
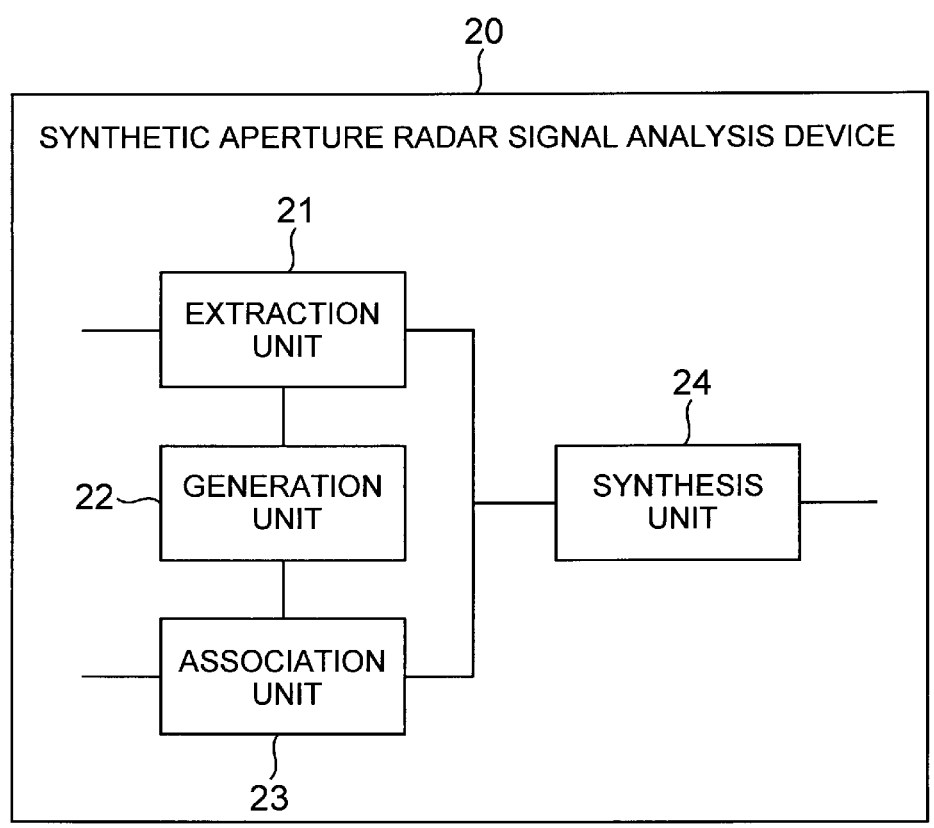
FIG. 17 is a block diagram showing the outline of a synthetic aperture radar signal analysis device according to the present invention.
Figure 18:
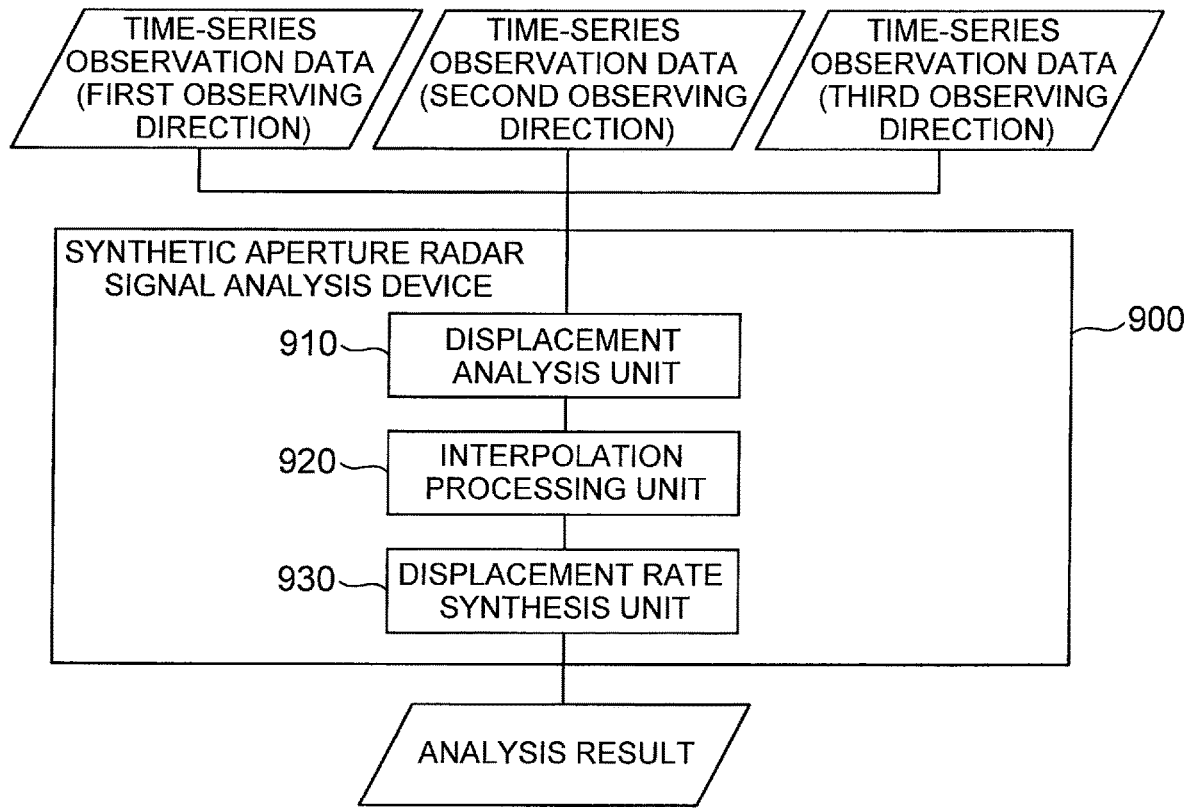
FIG. 18 is a block diagram showing a configuration example of a general synthetic aperture radar signal analysis device.
Figure 19:
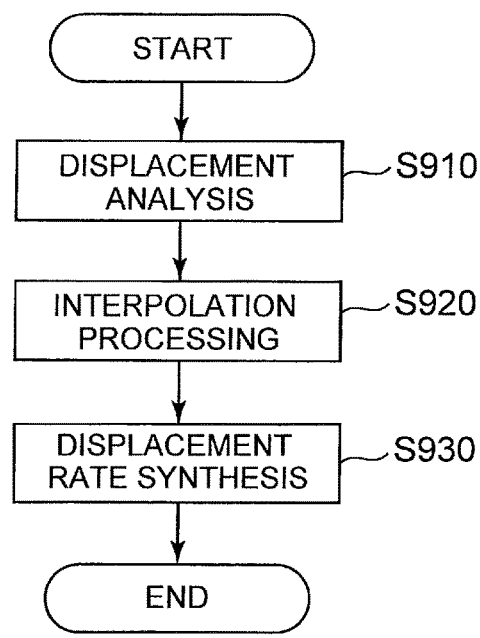
FIG. 19 is a flowchart showing the operation of the displacement rate computation process by the synthetic aperture radar signal analysis device 900.

The outline of the present invention will now be described. FIG. 17 is a block diagram showing the outline of a synthetic aperture radar signal analysis device according to the present invention. A synthetic aperture radar signal analysis device 20 includes: an extraction unit 21 (for example, the displacement analysis unit 110) which extracts a stable reflection point from time-series data acquired through observation, by a synthetic aperture radar, of a region to be observed from a predetermined observing direction; a generation unit 22 (for example, the clustering unit 120) which generates a cluster which is a collection of stable reflection points on the basis of the extracted stable reflection point corresponding to the predetermined observing direction; an association unit 23 (for example, the matching unit 140) which associates the generated cluster corresponding to the predetermined observing direction with a structure indicated by map data corresponding to the region to be observed; and a synthesis unit 24 (for example, the displacement rate synthesis unit 150) which performs vector-synthesis of displacement rates for a plurality of the clusters each corresponding to the observing direction associated with the structure.

The synthesis unit 24 may also compute the three-dimensional displacement rate of the structure by vector synthesis. The generation unit 22 may also generate a cluster on the basis of the phases and coordinates indicated by the stable reflection point.

Such a configuration allows the synthetic aperture radar signal analysis device to perform a three-dimensional displacement analysis of the structure with higher accuracy on the basis of each observation data observed from different directions by the synthetic aperture radar.

The synthetic aperture radar signal analysis device 20 also includes a determination unit (for example, the overlap determination unit 160) which determines two or more clusters having overlapping portions from among a plurality of the clusters each corresponding to the observing direction associated with the structure, and the synthesis unit 24 may use displacement rates for the determined two or more clusters. The determination unit may also determine two or more clusters having overlapping portions when displayed on the two-dimensional image.

Such a configuration allows the synthetic aperture radar signal analysis device to obtain a displacement analysis result with higher reliability.

The association unit 23 also computes an index indicating a reliability of the association between the cluster corresponding to the predetermined observing direction and the structure indicated by the map data, and the synthesis unit 24 may use the computed index to perform vector-synthesis of the displacement rates for the plurality of clusters.

The computed index may be a matching likelihood indicating the reliability of the association. The synthesis unit 24 may also use the computed matching likelihood as a weight.

Such a configuration allows the synthetic aperture radar signal analysis device to further improve the accuracy of the computed three-dimensional displacement rate.

The synthesis unit 24 may also perform vector-synthesis of the displacement rates for the plurality of clusters for each of a plurality of heights indicated by the stable reflection points constituting the clusters.

Such a configuration allows the synthetic aperture radar signal analysis device to detect the displacement corresponding to the height of the structure such as the inclination and falling.

The synthetic aperture radar signal analysis device 20 also includes an acquisition unit (for example, the map data acquisition unit 130) which acquires map data corresponding to the region to be observed from map data including information indicating a shape of a structure (for example, a road or a building) and the identification number of the structure, and the association unit 23 may use the acquired map data.

Such a configuration allows the synthetic aperture radar signal analysis device to obtain a displacement analysis result in the region to be observed.

Further, the extraction unit 21 may compute the displacement rate of the extracted stable reflection point, and the synthesis unit 24 may use the computed displacement rate of the stable reflection point constituting a cluster to compute the displacement rate for the cluster.

Such a configuration allows the synthetic aperture radar signal analysis device to obtain a displacement analysis result using a typical displacement rate of the cluster.

Although the present invention has been described with reference to the exemplary embodiments and examples, the present invention is not limited to the exemplary embodiments and examples. The configurations and details of the present invention may be modified in various ways as will be understood by those skilled in the art within the scope of the present invention.

INDUSTRIAL APPLICABILITY

The present invention is suitably applied to displacement analysis in which observation data from multiple directions are integrated among displacement analysis by a synthetic aperture radar using, for example, a satellite or an aircraft.

REFERENCE SIGNS LIST

10 CPU
11, 12 Storage device
13 Memory
20, 100 to 103, 900 Synthetic aperture radar signal analysis device
21 Extraction unit
22 Generation unit
23 Association unit
24 Synthesis unit
110, 910 Displacement analysis unit
120 Clustering unit
130 Map data acquisition unit
140 Matching unit
141 Edge forming unit
142 Edge detection unit
143 Edge shape matching unit
150, 930 Displacement rate synthesis unit
160 Overlap determination unit
170 Second matching unit
180 Second displacement rate synthesis unit
190 Third displacement rate synthesis unit
920 Interpolation processing unit

What is claimed is:

1. A synthetic aperture radar signal analysis device comprising:
   a memory configured to store instructions; and
   a processor configured to execute the instructions to:
   extract a stable reflection point from time-series data acquired through observation, by a synthetic aperture radar, of a region to be observed from a predetermined observing direction;
   generate a cluster which is a collection of stable reflection points on the basis of the many stable reflection points extracted from an edge of a structure corresponding to the predetermined observing direction;
   associate the generated cluster corresponding to the predetermined observing direction with a structure indicated by map data corresponding to the region to be observed; and
   perform vector-synthesis of displacement rates for a plurality of the clusters each corresponding to the observing direction associated with the structure.

2. The synthetic aperture radar signal analysis device according to claim 1, wherein the processor is further configured to execute the instructions to:
   determine two or more clusters having overlapping portions from among a plurality of the clusters each corresponding to the observing direction associated with the structure; and
   use displacement rates for the determined two or more clusters.

3. The synthetic aperture radar signal analysis device according to claim 2, wherein the processor is further configured to execute the instructions to:
  compute an index indicating a reliability of the association between the cluster corresponding to the predetermined observing direction and the structure indicated by the map data; and
  use the computed index to perform vector-synthesis of the displacement rates for the plurality of clusters.

4. The synthetic aperture radar signal analysis device according to claim 3, wherein the processor is further configured to execute the instructions to:
  perform vector-synthesis of the displacement rates for the plurality of clusters for each of a plurality of heights indicated by the stable reflection points constituting the clusters.

5. The synthetic aperture radar signal analysis device according to claim 2, wherein the processor is further configured to execute the instructions to:
  perform vector-synthesis of the displacement rates for the plurality of clusters for each of a plurality of heights indicated by the stable reflection points constituting the clusters.

6. The synthetic aperture radar signal analysis device according to claim 2, wherein the processor is further configured to execute the instructions to:
  acquire map data corresponding to the region to be observed from map data including information indicating a shape of a structure and information for identifying the structure; and
  use the acquired map data.

7. The synthetic aperture radar signal analysis device according to claim 2, wherein the processor is further configured to execute the instructions to:
  determine two or more clusters having overlapping portions when displayed on the two-dimensional image.

8. The synthetic aperture radar signal analysis device according to claim 1, wherein the processor is further configured to execute the instructions to:
  compute an index indicating a reliability of the association between the cluster corresponding to the predetermined observing direction and the structure indicated by the map data; and
  use the computed index to perform vector-synthesis of the displacement rates for the plurality of clusters.

9. The synthetic aperture radar signal analysis device according to claim 8, wherein the processor is further configured to execute the instructions to:
  perform vector-synthesis of the displacement rates for the plurality of clusters for each of a plurality of heights indicated by the stable reflection points constituting the clusters.

10. The synthetic aperture radar signal analysis device according to claim 8, wherein the processor is further configured to execute the instructions to:
  acquire map data corresponding to the region to be observed from map data including information indicating a shape of a structure and information for identifying the structure; and
  use the acquired map data.

11. The synthetic aperture radar signal analysis device according to claim 8, wherein
  the computed index is a matching likelihood indicating the reliability of the association, and the processor is further configured to execute the instructions to:
  use the computed matching likelihood as a weight.

12. The synthetic aperture radar signal analysis device according to claim 1, wherein the processor is further configured to execute the instructions to:
  perform vector-synthesis of the displacement rates for the plurality of clusters for each of a plurality of heights indicated by the stable reflection points constituting the clusters.

13. The synthetic aperture radar signal analysis device according to claim 1, wherein the processor is further configured to execute the instructions to:
  acquire map data corresponding to the region to be observed from map data including information indicating a shape of a structure and information for identifying the structure; and
  use the acquired map data.

14. The synthetic aperture radar signal analysis device according to claim 1, wherein the processor is further configured to execute the instructions to:
  compute the displacement rate of the extracted stable reflection point; and
  use the computed displacement rate of the stable reflection point constituting a cluster to compute the displacement rate for the cluster.

15. The synthetic aperture radar signal analysis device according to claim 1, wherein the processor is further configured to execute the instructions to:
  compute the three-dimensional displacement rate of the structure by vector synthesis.

16. The synthetic aperture radar signal analysis device according to claim 1, wherein the processor is further configured to execute the instructions to:
  generate a cluster on the basis of the phases and coordinates indicated by the stable reflection point.

17. A synthetic aperture radar signal analysis method comprising:
  extracting a stable reflection point from time-series data acquired through observation, by a synthetic aperture radar, of a region to be observed from a predetermined observing direction;
  generating a cluster which is a collection of stable reflection points on the basis of the many stable reflection points extracted from an edge of a structure corresponding to the predetermined observing direction;
  associating the generated cluster corresponding to the predetermined observing direction with a structure indicated by map data corresponding to the region to be observed; and
  performing vector-synthesis of displacement rates for a plurality of the clusters each corresponding to the observing direction associated with the structure.

18. The synthetic aperture radar signal analysis method according to claim 17, comprising
  determining two or more clusters having overlapping portions from among a plurality of the clusters each corresponding to the observing direction associated with the structure, and
  using displacement rates for the determined two or more clusters.

19. A non-transitory computer-readable medium storing a synthetic aperture radar signal analysis program for causing a computer to execute:
  an extraction process of extracting a stable reflection point from time-series data acquired through observation, by a synthetic aperture radar, of a region to be observed from a predetermined observing direction;
  a generation process of generating a cluster which is a collection of stable reflection points on the basis of the many stable reflection points extracted from an edge of a structure corresponding to the predetermined observing direction;

an association process of associating the generated cluster corresponding to the predetermined observing direction with a structure indicated by map data corresponding to the region to be observed; and a synthesis process of performing vector-synthesis of displacement rates for a plurality of the clusters each corresponding to the observing direction associated with the structure.

20. The medium storing the synthetic aperture radar signal analysis program according to claim 19, causing a computer to:

execute a determination process of determining two or more clusters having overlapping portions from among a plurality of the clusters each corresponding to the observing direction associated with the structure; and use displacement rates for the determined two or more clusters in the synthesis process.

\* \* \* \* \*